US012040480B2

(12) United States Patent
Sato et al.

(10) Patent No.: US 12,040,480 B2
(45) Date of Patent: Jul. 16, 2024

(54) SECONDARY BATTERY

(71) Applicant: MURATA MANUFACTURING CO., LTD., Kyoto (JP)

(72) Inventors: Futoshi Sato, Tokyo (JP); Yoshifumi Shimizu, Tokyo (JP); Taichi Kogure, Tokyo (JP); Aya Mashiko, Tokyo (JP); Takaaki Matsui, Tokyo (JP); Kazuki Honda, Tokyo (JP); Keitaro Kitada, Tokyo (JP); Yuta Hirano, Tokyo (JP); Masayuki Iwama, Tokyo (JP); Asuki Yanagihara, Tokyo (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 523 days.

(21) Appl. No.: 17/316,186

(22) Filed: May 10, 2021

(65) Prior Publication Data

US 2021/0265622 A1    Aug. 26, 2021

Related U.S. Application Data

(63) Continuation of application No. PCT/JP2019/045060, filed on Nov. 18, 2019.

(30) Foreign Application Priority Data

Nov. 30, 2018 (JP) ................................ 2018-225938

(51) Int. Cl.
*H01M 4/00* (2006.01)
*H01M 4/36* (2006.01)
(Continued)

(52) U.S. Cl.
CPC ........... *H01M 4/364* (2013.01); *H01M 4/505* (2013.01); *H01M 4/525* (2013.01);
(Continued)

(58) Field of Classification Search
CPC ............. H01M 4/48; H01M 4/50; H01M 4/52
See application file for complete search history.

(56) References Cited

U.S. PATENT DOCUMENTS 6,007,947 A * 12/1999 Mayer .................. H01M 4/505
429/223
2018/0040897 A1    2/2018 Park et al.

FOREIGN PATENT DOCUMENTS

CN         100438147 C   * 11/2008   ............ H01M 4/131
CN         107949949        4/2018
(Continued)

OTHER PUBLICATIONS

Am et al. The Anode of the Lithium Secondary Battery and the Lithium Secondary Battery, Nov. 2008, See the Abstract. (Year: 2008).*

(Continued)

*Primary Examiner* — Cynthia H Kelly
*Assistant Examiner* — Monique M Wills
(74) *Attorney, Agent, or Firm* — K&L Gates LLP

(57) ABSTRACT

A secondary battery includes a positive electrode, a negative electrode, and an electrolytic solution. The positive electrode includes a lithium-cobalt composite oxide having a layered rock-salt crystal structure. The negative electrode includes graphite. A potential variation of the positive electrode is greater than or equal to 2 mV when the secondary battery is discharged from a full charge state by a capacity corresponding to 1% of a maximum discharge capacity. The maximum discharge capacity is a discharge capacity obtained when the secondary battery is discharged with a constant current from the full charge state until the closed circuit voltage reaches 3.00 V, following which the secondary battery is discharged with a constant voltage of the closed circuit voltage of 3.00 V for 24 hours.

18 Claims, 7 Drawing Sheets

(51) Int. Cl.
  *H01M 4/505* (2010.01)
  *H01M 4/525* (2010.01)
  *H01M 4/58* (2010.01)
  *H01M 4/587* (2010.01)
  *H01M 10/0525* (2010.01)
  *H01M 10/0567* (2010.01)
  *H01M 4/02* (2006.01)

(52) U.S. Cl.
  CPC ......... *H01M 4/5825* (2013.01); *H01M 4/587* (2013.01); *H01M 10/0525* (2013.01); *H01M 10/0567* (2013.01); *H01M 2004/021* (2013.01); *H01M 2004/027* (2013.01); *H01M 2004/028* (2013.01); *H01M 2220/20* (2013.01); *H01M 2300/0025* (2013.01)

(56) References Cited

FOREIGN PATENT DOCUMENTS

| | | |
|---|---|---|
| JP | 2004-241339 A | 8/2004 |
| JP | 2006-059800 A | 3/2006 |
| JP | 2017-021942 A | 1/2017 |
| JP | 2018-527718 A | 9/2018 |
| WO | 2014/068831 A1 | 5/2014 |

OTHER PUBLICATIONS

International Search Report mailed on Feb. 18, 2020 in connection with PCT/JP2019/045060.
Chinese Office Action issued Aug. 18, 2023 in corresponding Chinese Application No. 201980078835.

\* cited by examiner

SECONDARY BATTERY

CROSS REFERENCE TO RELATED APPLICATIONS

The present application is a continuation of PCT patent application no. PCT/JP2019/045060, filed on Nov. 18, 2019, which claims priority to Japanese patent application no. JP2018-225938 filed on Nov. 30, 2018, the entire contents of which are being incorporated herein by reference.

BACKGROUND

The present technology relates to a secondary battery.

Various electronic apparatuses such as mobile phones have been widely used. Accordingly, a secondary battery is under development as a power source which is smaller in size and lighter in weight and allows for a higher energy density. The secondary battery includes a positive electrode, a negative electrode, and an electrolytic solution.

Various considerations have been given to a configuration of the secondary battery to improve battery characteristics. Specifically, to increase an energy density, a potential of a positive electrode at a full charge is set to be high and a potential of a negative electrode at a full charge is set to be low.

SUMMARY

The present technology relates to a secondary battery.

Electronic apparatuses, on which a secondary battery is to be mounted, are increasingly gaining higher performance and more functions, causing more frequent use of the electronic apparatuses and expanding a use environment of the electronic apparatuses. Accordingly, there is still room for improvement in terms of a cyclability characteristic and a swelling characteristic of the secondary battery.

The present technology has been made in view of such an issue and it is an object of the technology to provide a secondary battery that makes it possible to achieve a superior cyclability characteristic and a superior swelling characteristic.

A secondary battery according to an embodiment of the present technology includes a positive electrode, a negative electrode, and an electrolytic solution. The positive electrode includes a lithium-cobalt composite oxide represented by Formula (1) and having a layered rock-salt crystal structure. The negative electrode includes graphite. A potential variation of the positive electrode represented by Formula (2) is greater than or equal to 2 mV when the secondary battery is discharged from a full charge state by a capacity corresponding to 1% of a maximum discharge capacity. The full charge state is a state in which the secondary battery is charged with a constant voltage of a closed circuit voltage of higher than or equal to 4.38 V for 24 hours. The maximum discharge capacity is a discharge capacity obtained when the secondary battery is discharged with a constant current from the full charge state until the closed circuit voltage reaches 3.00 V, following which the secondary battery is discharged with a constant voltage of the closed circuit voltage of 3.00 V for 24 hours.

(1)

where:
M represents at least one of titanium (Ti), vanadium (V), chromium (Cr), manganese (Mn), iron (Fe), nickel (Ni), copper (Cu), sodium (Na), magnesium (Mg), aluminum (Al), silicon (Si), tin (Sn), potassium (K), calcium (Ca), zinc (Zn), gallium (Ga), strontium (Sr), yttrium (Y), zirconium (Zr), niobium (Nb), molybdenum (Mo), barium (Ba), lanthanum (La), tungsten (W), or boron (B); X represents at least one of fluorine (F), chlorine (Cl), bromine (Br), iodine (I), or sulfur (S); and x, y, and z satisfy $0.8<x<1.2$, $0 \leq y<0.15$, and $0 \leq z<0.05$.

$$\text{Potential variation}(mV) \text{ of positive electrode} = \text{first positive electrode potential}(mV) - \text{second positive electrode potential}(mV) \quad (2)$$

where:
the first positive electrode potential is an open circuit potential, versus a lithium reference electrode, of the positive electrode measured in the full charge state; and
the second positive electrode potential is an open circuit potential, versus a lithium reference electrode, of the positive electrode measured in a state in which the secondary battery is discharged from the full charge state by the capacity corresponding to 1% of the maximum discharge capacity.

According to the secondary battery of the present technology, the positive electrode includes the lithium-cobalt composite oxide, the negative electrode includes the graphite, and the potential variation of the positive electrode is greater than or equal to 2 mV when the secondary battery is discharged from the full charge state by the capacity corresponding to 1% of the maximum discharge capacity. Accordingly, it is possible to achieve a superior cyclability characteristic and a superior swelling characteristic.

It should be understood that effects of the technology are not necessarily limited to those described above and may include any of a series of effects described below in relation to the technology.

DETAILED DESCRIPTION

As described herein, the present disclosure will be described based on examples with reference to the drawings, but the present disclosure is not to be considered limited to the examples, and various numerical values and materials in the examples are considered by way of example.

A description is given first of a secondary battery according to an embodiment of the present technology.

The secondary battery described below is a lithium-ion secondary battery that obtains a battery capacity on the basis of a lithium insertion phenomenon and a lithium extraction phenomenon, as will be described later. The secondary battery includes a positive electrode 13 and a negative electrode 14 (see FIG. 3).

To prevent precipitation of lithium metal on a surface of the negative electrode 14 during charging, an electrochemical capacity per unit area of the negative electrode 14 is greater than an electrochemical capacity per unit area of the positive electrode 13 in the secondary battery.

It should be understood that, however, mass of a positive electrode active material included in the positive electrode 13 is sufficiently greater than mass of a negative electrode active material included in the negative electrode 14 to allow a configuration condition (a positive electrode potential variation Ew), which will be described later, to be satisfied.

Figure 1:
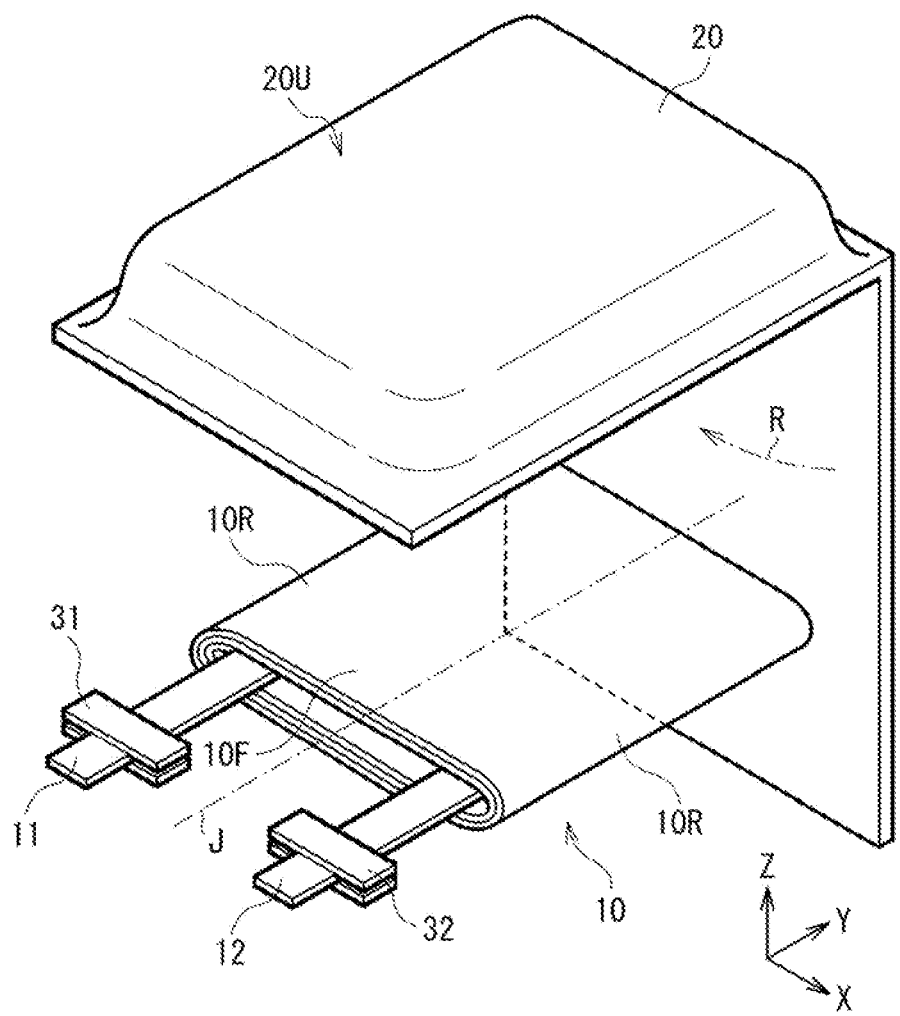
FIG. 1 is a perspective view of a configuration of a secondary battery according to an embodiment of the present technology.
Figure 2:
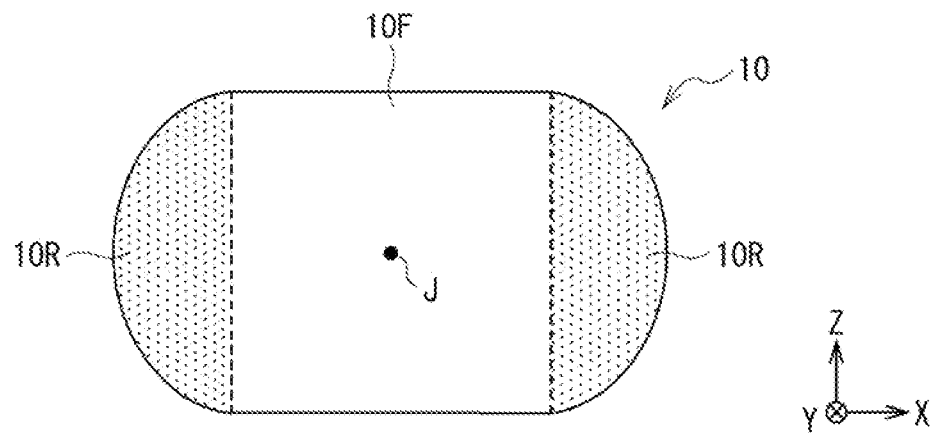
FIG. 2 is a schematic plan view of a configuration of a wound electrode body illustrated in FIG. 1.
Figure 3:
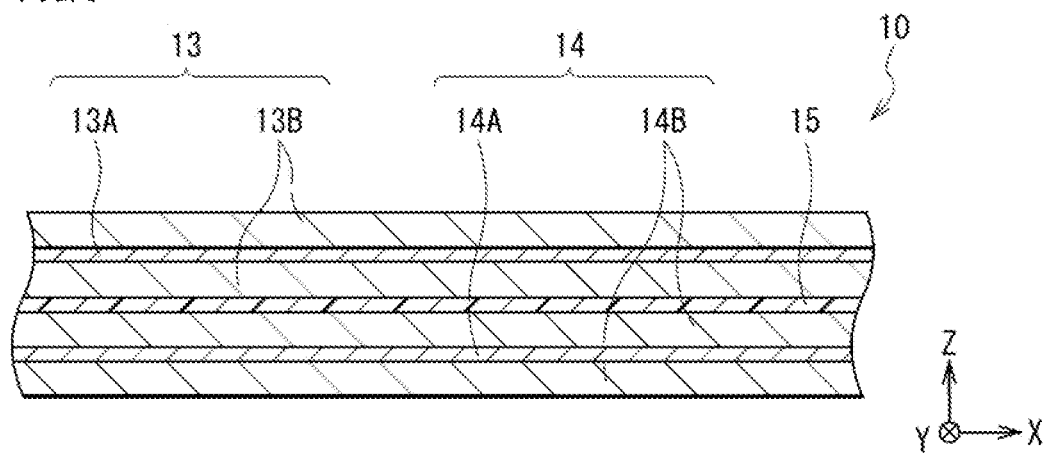
FIG. 3 is an enlarged sectional view of the configuration of the wound electrode body illustrated in FIG. 1.

FIG. 1 is a perspective view of a configuration of the secondary battery. FIG. 2 is a schematic plan view of a configuration of a wound electrode body 10 illustrated in FIG. 1. FIG. 3 is an enlarged sectional view of the configuration of the wound electrode body 10. It should be understood that FIG. 1 illustrates a state in which the wound electrode body 10 and an outer package member 20 are separated away from each other, and FIG. 3 illustrates only a portion of the wound electrode body 10.

Referring to FIG. 1, the secondary battery includes, for example: the outer package member 20 having a film shape; and the wound electrode body 10 housed in the outer package member 20. The outer package member 20 has flexibility or softness. The wound electrode body 10 serves as a battery device. A positive electrode lead 11 and a negative electrode lead 12 are coupled to the wound electrode body 10. In other words, the secondary battery described here is a so-called laminated secondary battery.

Referring to FIG. 1, the outer package member 20 is, for example, a single film that is foldable in a direction of an arrow R. The outer package member 20 has a depression 20U, for example. The depression 20U is adapted to receive the wound electrode body 10. Thus, the outer package member 20 houses the wound electrode body 10, thereby housing, for example, the positive electrode 13, the negative electrode 14, and an electrolytic solution to be described later.

The outer package member 20 may be, for example: a film (a polymer film) including a polymer compound; a thin metal plate (a metal foil); or a stacked body (a laminated film) in which the polymer film and the metal foil are stacked on each other. The polymer film may have a single layer or multiple layers. In a similar manner, the metal foil may have a single layer or multiple layers. The laminated film may have, for example, polymer films and metal foils that are alternately stacked. The number of stacked layers of the polymer films and the number of stacked layers of the metal foils may each be set to any value.

In particular, the outer package member 20 is preferably a laminated film. A reason for this is that a sufficient sealing property is obtainable, and sufficient durability is also obtainable. Specifically, the outer package member 20 is a laminated film including, for example, a fusion-bonding layer, a metal layer, and a surface protective layer that are stacked in this order from an inner side toward an outer side. In a process of manufacturing the secondary battery, for example, the outer package member 20 is folded in such a manner that portions of the fusion-bonding layer oppose each other with the wound electrode body 10 interposed therebetween. Thereafter, outer edges of the fusion-bonding layer are fusion bonded to each other, thereby sealing the outer package member 20. The fusion-bonding layer is, for example, a polymer film including polypropylene. The metal layer is, for example, a metal foil including aluminum. The surface protective layer is, for example, a polymer film including nylon.

The outer package member 20 may include, for example, two laminated films that are adhered to each other by means of a material such as an adhesive.

A sealing film 31, for example, is disposed between the outer package member 20 and the positive electrode lead 11. The sealing film 31 is adapted to prevent entry of outside air into the outer package member 20. The sealing film 31 includes, for example, a polyolefin resin such as polypropylene.

A sealing film 32, for example, is disposed between the outer package member 20 and the negative electrode lead 12. The sealing film 32 has a role similar to that of the sealing film 31 described above. A material included in the sealing film 32 is, for example, similar to the material included in the sealing film 31.

As illustrated in FIGS. 1 to 3, the wound electrode body 10 includes the positive electrode 13, the negative electrode 14, and a separator 15, for example. In the wound electrode body 10, the positive electrode 13 and the negative electrode 14 are stacked with the separator 15 interposed therebetween, and the stack of the positive electrode 13, the negative electrode 14, and the separator 15 is wound, for example. The wound electrode body 10 is impregnated with an electrolytic solution, for example. The electrolytic solution is a liquid electrolyte. The positive electrode 13, the negative electrode 14, and the separator 15 are each impregnated with the electrolytic solution accordingly, for example. A surface of the wound electrode body 10 may be protected by means of an unillustrated protective tape.

In a process of manufacturing the secondary battery, which will be described later, a jig having an elongated shape is used to wind the positive electrode 13, the negative electrode 14, and the separator 15 about a winding axis J, for example. The winding axis J is an axis extending in a Y-axis direction. Accordingly, the wound electrode body 10 is formed into an elongated shape resulting from the shape of the jig, as illustrated in FIG. 1, for example. Thus, as illustrated in FIG. 2, for example, the wound electrode body 10 includes a flat part (a flat part 10F) located in the middle and a pair of curved parts (curved parts 10R) located on both ends of the flat part 10F. That is, the paired curved parts 10R oppose each other with the flat part 10F interposed therebetween. FIG. 2 includes a dashed line that indicates a border between the flat part 10F and each of the curved parts 10R and shading in the curved parts 10R for easier distinction between the flat part 10F and the curved parts 10R.

As illustrated in FIG. 3, the positive electrode 13 includes, for example, a positive electrode current collector 13A, and a positive electrode active material layer 13B provided on the positive electrode current collector 13A. The positive electrode active material layer 13B may be provided, for example, only on one side of the positive electrode current collector 13A, or on each of both sides of the positive electrode current collector 13A. FIG. 3 illustrates a case where the positive electrode active material layer 13B is provided on each of both sides of the positive electrode current collector 13A, for example.

The positive electrode current collector 13A includes, for example, an electrically conductive material such as aluminum. The positive electrode active material layer 13B includes, as a positive electrode active material or positive electrode active materials, one or more of positive electrode materials into which lithium ions are insertable and from which lithium ions are extractable. The positive electrode active material layer 13B may further include another material, examples of which include a positive electrode binder and a positive electrode conductor.

The positive electrode material includes a lithium compound. The term "lithium compound" is a generic term for a compound that includes lithium as a constituent element. A reason why the positive electrode material includes the lithium compound is that a high energy density is achievable. The lithium compound includes a lithium-cobalt composite oxide having a layered rock-salt crystal structure. Hereinafter, the lithium-cobalt composite oxide having the layered rock-salt crystal structure is referred to as a "layered rock-salt lithium-cobalt composite oxide". A reason why the lithium compound includes the layered rock-salt lithium-cobalt composite oxide is that a high energy density is stably achievable. The term "layered rock-salt lithium-cobalt composite oxide" is a generic term for a composite oxide that includes lithium and cobalt as constituent elements. Accordingly, the layered rock-salt lithium-cobalt composite oxide may further include one or more of other elements (elements other than lithium and cobalt). The other elements are not limited to particular kinds; however, the other elements may be those belong to groups 2 to 15 in the long periodic table of elements, for example.

Specifically, the layered rock-salt lithium-cobalt composite oxide includes one or more of compounds represented by Formula (1). A reason for this is that a sufficient energy density is stably achievable. It should be understood that a composition of lithium differs depending on a charge state and a discharge state. A value of x included in Formula (1) represents a value in a state in which the positive electrode 13 taken out from the secondary battery has been discharged until the potential has reached 3 V (versus a lithium reference electrode).

$$Li_xCo_{1-y}M_yO_{2-z}X_z \quad (1)$$

where:
M represents at least one of titanium (Ti), vanadium (V), chromium (Cr), manganese (Mn), iron (Fe), nickel (Ni), copper (Cu), sodium (Na), magnesium (Mg), aluminum (Al), silicon (Si), tin (Sn), potassium (K), calcium (Ca), zinc (Zn), gallium (Ga), strontium (Sr), yttrium (Y), zirconium (Zr), niobium (Nb), molybdenum (Mo), barium (Ba), lanthanum (La), tungsten (W), or boron (B); X represents at least one of fluorine (F), chlorine (Cl), bromine (Br), iodine (I), or sulfur (S); and x, y, and z satisfy 0.8<x<1.2, 0≤y<0.15, and 0≤z<0.05.

As is apparent from Formula (1), the layered rock-salt lithium-cobalt composite oxide is a cobalt-based lithium composite oxide. The layered rock-salt lithium-cobalt composite oxide may further include one or more of first additional elements (M), and may further include one or more of second additional elements (X). Details of each of the first additional element (M) and the second additional element (X) are as described above.

In other words, as is apparent from a value range that y can take, the layered rock-salt lithium-cobalt composite oxide may include no first additional element (M). Similarly, as is apparent from a value range that z can take, the layered rock-salt lithium-cobalt composite oxide may include no second additional element (X).

The layered rock-salt lithium-cobalt composite oxide is not limited to a particular kind as long as the layered rock-salt lithium-cobalt composite oxide is a compound represented by Formula (1). Specific examples of the layered rock-salt lithium-cobalt composite oxide include $LiCoO_2$, $LiCo_{0.98}Al_{0.02}O_2$, $LiCo_{0.98}Mn_{0.02}O_2$, and $LiCo_{0.98}Mg_{0.02}O_2$.

It should be understood that the positive electrode material may include, for example, one or more of other lithium compounds together with the lithium compound (the layered rock-salt lithium-cobalt composite oxide) described above. Examples of the other lithium compounds include another lithium composite oxide and a lithium phosphate compound.

The term "other lithium composite oxide" is a generic term for a composite oxide that includes, as constituent elements, lithium and one or more of other elements. The other lithium composite oxide has any of crystal structures including, without limitation, a layered rock-salt crystal structure and a spinel crystal structure, for example. However, a compound corresponding to the layered rock-salt lithium-cobalt composite oxide is excluded from the other lithium composite oxide described here. The term "lithium phosphate compound" is a generic term for a phosphate compound that includes, as constituent elements, lithium and one or more of the other elements. The lithium phosphate compound has a crystal structure such as an olivine crystal structure, for example. Details of the other elements are as described above.

Examples of the other lithium composite oxide having the layered rock-salt crystal structure include $LiNiO_2$. Examples of the other lithium composite oxide having the spinel crystal structure include $LiMn_2O_4$. Examples of the lithium phosphate compound having the olivine crystal structure include $LiFePO_4$, $LiMnPO_4$, and $LiMn_{0.5}Fe_{0.5}PO_4$.

The positive electrode binder includes one or more of materials including, without limitation, a synthetic rubber and a polymer compound, for example. Examples of the synthetic rubber include a styrene-butadiene-based rubber. Examples of the polymer compound include polyvinylidene difluoride and polyimide.

The positive electrode conductor includes, for example, one or more of electrically conductive materials such as a carbon material. Examples of the carbon material include graphite, carbon black, acetylene black, and Ketjen black. The electrically conductive material may be a material such as a metal material or an electrically conductive polymer.

As illustrated in FIG. 3, the negative electrode 14 includes, for example, a negative electrode current collector 14A, and a negative electrode active material layer 14B provided on the negative electrode current collector 14A. The negative electrode active material layer 14B may be provided, for example, only on one side of the negative electrode current collector 14A, or on each of both sides of the negative electrode current collector 14A. FIG. 3 illustrates a case where the negative electrode active material layer 14B is provided on each of both sides of the negative electrode current collector 14A, for example.

The negative electrode current collector 14A includes, for example, an electrically conductive material such as copper. It is preferable that the negative electrode current collector 14A have a surface roughened by a method such as an electrolysis method. A reason for this is that improved adherence of the negative electrode active material layer 14B to the negative electrode current collector 14A is achievable by utilizing an anchor effect.

The negative electrode active material layer 14B includes, as a negative electrode active material or negative electrode active materials, one or more of negative electrode materials into which lithium ions are insertable and from which lithium ions are extractable. The negative electrode active material layer 14B may further include another material such as a negative electrode binder or a negative electrode conductor.

The negative electrode material includes a carbon material. The term "carbon material" is a generic term for a material mainly including carbon as a constituent element. A reason why the negative electrode material includes the carbon material is that a high energy density is stably obtainable owing to the crystal structure of the carbon material which hardly varies upon insertion and extraction of lithium ions. Another reason is that improved electrical conductivity of the negative electrode active material layer 14B is achievable owing to the carbon material which also serves as the negative electrode conductor.

Specifically, the negative electrode material includes graphite. The graphite is not limited to a particular kind. The graphite may be therefore artificial graphite, natural graphite, or both.

In a case where the negative electrode material includes pieces of particulate graphite (graphite particles), an average particle diameter (a median diameter D50) of the graphite particles is not particularly limited; however, the median diameter D50 is preferably from 3.5 μm to 30 μm both inclusive, and more preferably from 5 μm to 20 μm both inclusive. A reason for this is that precipitation of lithium metal is suppressed and occurrence of a side reaction is also suppressed. In detail, the median diameter D50 of smaller than 3.5 μm makes it easier for the side reaction to occur on surfaces of the graphite particles due to increased surface areas of the graphite particles, which may decrease initial-cycle charge and discharge efficiency. In contrast, if the median diameter D50 is larger than 30 μm, gaps (vacancies) between the graphite particles, which are flowing paths of the electrolytic solution, may be unevenly distributed, which may cause precipitation of lithium metal.

Here, it is preferable that some or all of the graphite particles form so-called secondary particles. A reason for this is that an orientation of the negative electrode 14 (the negative electrode active material layer 14B) is suppressed, thereby suppressing swelling of the negative electrode active material layer 14B upon charging and discharging. With respect to a weight of the graphite particles, a proportion of a weight of graphite particles forming the secondary particles is not particularly limited; however, the proportion is preferably from 20 wt % to 80 wt % both inclusive in particular. If the proportion of the graphite particles forming the secondary particles is relatively high, a total surface area of the particles is excessively increased due to a relatively small average particle diameter of primary particles, which may cause a decomposition reaction of the electrolytic solution to occur and a capacity per unit weight to be decreased.

In a case where graphite is analyzed by X-ray diffractometry (XRD), spacing of a graphene layer, having a graphite crystal structure, determined from a position of a peak derived from a (002) plane, that is, spacing S of the (002) plane, is preferably from 0.3355 nm to 0.3370 nm both inclusive, and more preferably from 0.3356 nm to 0.3363 nm both inclusive. A reason for this is that the decomposition reaction of the electrolytic solution is reduced while securing the battery capacity. In detail, if the spacing S is greater than 0.3370 nm, the battery capacity may be reduced due to inadequate graphitization of graphite. In contrast, if the spacing S is smaller than 0.3355 nm, a reactivity of the graphite to the electrolytic solution increases due to excessive graphitization of the graphite, which may cause the decomposition reaction of the electrolytic solution to occur.

The negative electrode material may include, for example, one or more of other materials together with the carbon material (graphite) described above. Examples of the other materials include another carbon material and a metal-based material. A reason why the negative electrode material may include one or more of the other materials is that the energy density further increases.

Examples of the other carbon material include non-graphitizable carbon. A reason for this is that a high energy density is stably achievable. A physical property of the non-graphitizable carbon is not particularly limited; however, in particular, spacing of the (002) plane is preferably greater than or equal to 0.37 nm. A reason for this is that a sufficient energy density is achievable.

The term "metal-based material" is a generic term for a material including, as a constituent element or constituent elements, one or more of: metal elements that are each able to form an alloy with lithium; and metalloid elements that are each able to form an alloy with lithium. The metal-based material may be a simple substance, an alloy, a compound, a mixture of two or more thereof, or a material including one or more phases thereof.

It should be understood that the simple substance described here merely refers to a simple substance in a general sense. The simple substance may therefore include a small amount of impurity, that is, does not necessarily have a purity of 100%. The term "alloy" encompasses, for example, not only a material that includes two or more metal elements but may also encompass a material that includes one or more metal elements and one or more metalloid elements. The alloy may further include one or more non-metallic elements. The metal-based material has a state such as a solid solution, a eutectic (a eutectic mixture), an intermetallic compound, or a state including two or more thereof that coexist, although not particularly limited thereto.

Specific examples of the metal element and the metalloid element include magnesium, boron, aluminum, gallium, indium, silicon, germanium, tin, lead, bismuth, cadmium, silver, zinc, hafnium, zirconium, yttrium, palladium, and platinum.

Among the above-described materials, a material including silicon as a constituent element is preferable. Hereinafter, the material including silicon as a constituent element is referred to as a "silicon-containing material". A reason why the silicon-containing material is preferable is that a markedly high energy density is obtainable owing to superior lithium-ion insertion capacity and superior lithium-ion extraction capacity thereof.

The silicon alloy includes, as a constituent element or constituent elements other than silicon, for example, one or more of tin, nickel, copper, iron, cobalt, manganese, zinc, indium, silver, titanium, germanium, bismuth, antimony, and chromium. The silicon compound includes, as a constituent element or constituent elements other than silicon, for example, one or more of materials including, without limitation, carbon and oxygen. The silicon compound may include, as a constituent element or constituent elements other than silicon, one or more of the series of constituent elements described in relation to the silicon alloy, for example.

Specific examples of the silicon-containing material include $SiB_4$, $SiB_6$, $Mg_2Si$, $Ni_2Si$, $TiSi_2$, $MoSi_2$, $CoSi_2$, $NiSi_2$, $CaSi_2$, $CrSi_2$, $Cu_5Si$, $FeSi_2$, $MnSi_2$, $NbSi_2$, $TaSi_2$, $VSi_2$, $WSi_2$, $ZnSi_2$, SiC, $Si_3N_4$, $Si_2N_2O$, and a silicon oxide represented by Formula (3). In particular, the silicon oxide is preferable. A reason for this is that the silicon oxide has a relatively large capacity per unit weight and a relatively large capacity per unit volume compared with graphite. Another reason is that, in the silicon oxide which includes oxygen, a structure thereof is stabilized by an oxygen-silicon bond and a lithium-oxygen bond after being lithiated, thereby suppressing cracking of the particles. The silicon oxide is not limited to a particular kind, and examples thereof include SiO.

$$SiO_v \qquad (3)$$

where v satisfies $0.5 \leq v \leq 1.5$.

Details of the negative electrode binder are similar to those of the positive electrode binder, for example. Details of the negative electrode conductor are similar to those of the positive electrode conductor, for example. However, the negative electrode binder may be, for example, a water-based (water-soluble) polymer compound. Examples of the water-soluble polymer compound include carboxymethyl cellulose and a metal salt thereof.

The separator 15 is interposed between the positive electrode 13 and the negative electrode 14, and causes the positive electrode 13 and the negative electrode 14 to be separated away from each other. The separator 15 includes a porous film of a material such as a synthetic resin or ceramic, for example. The separator 15 may be a stacked film including two or more porous films that are stacked on each other, in one example. Examples of the synthetic resin include polyethylene.

It is preferable that, after the wound electrode body 10 is fabricated, the wound electrode body 10 be heated to cause the separator 15 to be fusion bonded to the positive electrode 13 and to the negative electrode 14. A reason for this is that the wound electrode body 10 is prevented from easily deformed even if charging and discharging are repeated owing to that a distance between the positive electrode 13 and the negative electrode 14 is easily kept constant. It should be understood that the heating temperature of the wound electrode body 10 may be set to any value.

The electrolytic solution includes, for example, a solvent and an electrolyte salt. Only one solvent may be used, or two or more solvents may be used. Only one electrolyte salt may be used, or two or more electrolyte salts may be used.

The solvent includes one or more of non-aqueous solvents (organic solvents), for example. An electrolytic solution including the non-aqueous solvent is a so-called non-aqueous electrolytic solution.

The non-aqueous solvent is not limited to a particular kind, and examples thereof include a carbonate ester, a lactone, a chain carboxylate ester, and a nitrile (mononitrile) compound. The carbonate ester may have a cyclic structure or a chain structure, i.e., may be a cyclic carbonate ester or a chain carbonate ester. Further, the chain carboxylate ester may have: a chain structure; or a branched structure having one or more side chains. A reason why such a non-aqueous solvent may be used is that characteristics including, without limitation, a capacity characteristic, a cyclability characteristic, and a storage characteristic are secured.

Examples of the cyclic carbonate ester include ethylene carbonate and propylene carbonate. Examples of the chain carbonate ester include dimethyl carbonate and diethyl carbonate. Examples of the lactone include γ-butyrolactone and γ-valerolactone. Examples of the chain carboxylate ester include an acetate ester, a propionate ester, and a butyrate ester. More specific examples of the chain carboxylate ester include methyl acetate, ethyl acetate, methyl propionate, propyl propionate, and methyl butyrate. Examples of the nitrile compound include acetonitrile, methoxy acetonitrile, and 3-methoxy propionitrile.

In particular, it is preferable that the solvent include: the carbonate ester, the lactone, or both; and the chain carboxylate ester. The carbonate ester may be, for example, a cyclic carbonate ester, a chain carbonate ester, or both. Only one carbonate ester may be used, or two or more carbonate esters may be used. Only one lactone may be used, or two or more lactones may be used. Only one chain carboxylate ester may be used, or two or more chain carboxylate esters may be used.

A reason why the solvent includes the chain carboxylate ester together with the carbonate ester, the lactone, or both is that the chain carboxylate ester has a low viscosity, making it easier for the lithium ions to move in the electrolytic solution. This suppresses the precipitation of lithium metal on the negative electrode 14 upon charging and discharging, and in particular, suppresses the precipitation of lithium metal even if the charge voltage Ec to be described later is increased.

The chain carboxylate ester is not limited to a particular kind; however, in particular, one or more of an acetate ester, a propionate ester, and a butyrate ester are preferable. In this case, a molecular weight of the chain carboxylate ester is not particularly limited; however, the molecular weight is preferably less than or equal to 119. A reason for this is that a viscosity of the electrolytic solution does not increase excessively, suppressing inhibition of movement of lithium ions. This improves ionic conductivity of the lithium ions. Specific examples of the chain carboxylate ester include methyl acetate, ethyl acetate, propyl acetate, butyl acetate, methyl propionate, ethyl propionate, propyl propionate, methyl butyrate, 2-methyl ethyl propionate, 2-methyl methyl propionate, and 2,2-dimethyl propionate.

A proportion of a volume of the chain carboxylate ester to a sum total of a volume of the carbonate ester, a volume of the lactone, and the volume of the chain carboxylate ester is not particularly limited; however, in particular, the proportion is preferably from 10 vol % to 80 vol % both inclusive. The proportion (vol %) is calculated by a calculation formula: proportion=[volume of chain carboxylate ester/(volume of carbonate ester+volume of lactone+volume of chain carboxylate ester)]×100.

A reason why the proportion is within the above-described range is that this suppresses the precipitation of lithium metal on the negative electrode 14. Specifically, when a potential E of the negative electrode 14 decreases at the end of charging, a capacity range to be actually used becomes sufficiently large with respect to the theoretical capacity of the negative electrode 14, as will be described later. This decreases mobility of the lithium ions in the electrolytic solution, and the precipitation of lithium metal thus tends to occur on the negative electrode 14 at the end of charging. However, in a case where a configuration condition (a positive electrode potential variation Ew) to be described later is satisfied and where the proportion of the chain carboxylate ester having a low viscosity is within the above-described range, it becomes easier for the lithium ions to move in the electrolytic solution, which improves a diffusing property of the lithium ions. As a result, the precipitation of lithium metal is suppressed on the negative electrode 14 even if the charge voltage Ec is increased.

Examples of the non-aqueous solvent further include an unsaturated cyclic carbonate ester, a halogenated carbonate ester, a sulfonate ester, an acid anhydride, a dicyano compound (a dinitrile compound), a diisocyanate compound, and a phosphate ester. A reason why such a non-aqueous solvent may be used is that one or more of the above-described characteristics including, without limitation, a capacity characteristic are further improved.

Examples of the unsaturated cyclic carbonate ester include vinylene carbonate, vinyl ethylene carbonate, and methylene ethylene carbonate. The halogenated carbonate ester may be a cyclic halogenated carbonate ester or a chain halogenated carbonate ester. Examples of the halogenated carbonate ester include 4-fluoro-1,3-dioxolane-2-one, 4,5-difluoro-1,3-dioxolane-2-one, and fluoromethyl methyl carbonate. Examples of the sulfonate ester include 1,3-propane sultone and 1,3-propene sultone. Examples of the acid anhydride include succinic anhydride, glutaric anhydride, maleic anhydride, ethane disulfonic anhydride, propane disulfonic anhydride, sulfobenzoic anhydride, sulfopropionic anhydride, and sulfobutyric anhydride. Examples of the dinitrile compound include succinonitrile, glutaronitrile, adiponitrile, sebaconitrile, and phthalonitrile. Examples of the diisocyanate compound include hexamethylene diisocyanate. Examples of the phosphate ester include trimethyl phosphate and triethyl phosphate.

In particular, in a case where the solvent includes the chain carboxylate ester, it is preferable that the solvent include the dinitrile compound. Only one dinitrile compound may be used, or two or more dinitrile compounds may be used. A reason why it is preferable that the solvent include the dinitrile compound is that: an oxidation resistance of the chain carboxylate ester is low, thereby making it easier for the chain carboxylate ester to be decomposed upon charging and discharging; however, the oxidation resistance of the chain carboxylate ester is increased if the solvent includes the dinitrile compound, thereby suppressing decomposition of the chain carboxylate ester upon charging and discharging. In particular, the chain carboxylate ester tends to be easily decomposed in a high-temperature environment; however, if the electrolytic solution includes the dinitrile compound, the decomposition of the chain carboxylate ester is sufficiently suppressed even in the high-temperature environment.

A content of the dinitrile compound in the electrolytic solution is not particularly limited; however, in particular, the content is preferably from 1 wt % to 20 wt % both inclusive. A reason for this is that the decomposition of the chain carboxylate ester is sufficiently suppressed while decrease in battery capacity is suppressed.

The electrolyte salt includes one or more of lithium salts, for example. The electrolyte salt may further include one or more of light metal salts other than the lithium salt. The lithium salt is not limited to a particular kind, and examples thereof include lithium hexafluorophosphate ($LiPF_6$), lithium tetrafluoroborate ($LiBF_4$), lithium bis(fluorosulfonyl)imide ($LiN(SO_2F)_2$), lithium bis(trifluoromethane sulfonyl)imide ($LiN(CF_3SO_2)_2$), lithium fluorophosphate ($Li_2PFO_3$), lithium difluorophosphate ($LiPF_2O_2$), and lithium bis(oxalato)borate ($LiC_4BO_8$). A reason why the electrolyte salt may include such a lithium salt is that characteristics including, without limitation, a capacity characteristic, a cyclability characteristic, and a storage characteristic are secured.

A content of the electrolyte salt is, for example, from 0.3 mol/kg to 3.0 mol/kg with respect to the solvent, but is not particularly limited thereto. [0076] The positive electrode lead 11 is coupled to the positive electrode 13, and is led out from inside to outside the outer package member 20. The positive electrode lead 11 includes, for example, an electrically conductive material such as aluminum. The positive electrode lead 11 has a shape such as a thin plate shape or a meshed shape, for example.

The negative electrode lead 12 is coupled to the negative electrode 14, and is led out from inside to outside the outer package member 20. A lead-out direction of the negative electrode lead 12 is, for example, similar to a lead-out direction of the positive electrode lead 11. The negative electrode lead 12 includes, for example, an electrically conductive material such as nickel. The negative electrode lead 12 has a shape similar to the shape of the positive electrode lead 11, for example.

Figure 4:
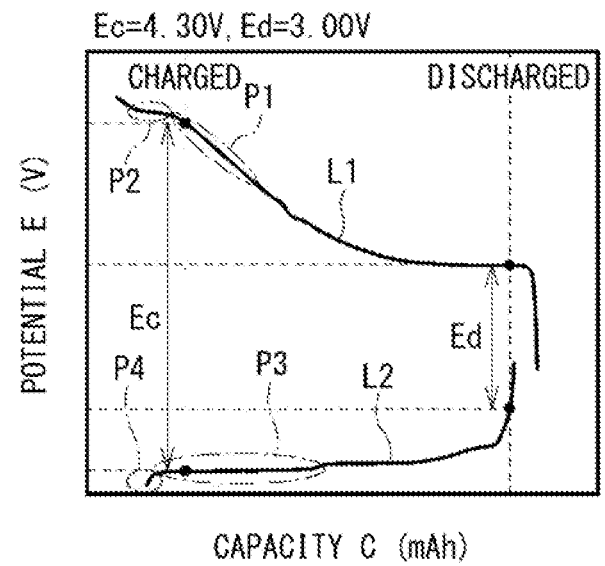
FIG. 4 is a capacity potential curve (charge voltage Ec=4.30 V) of a secondary battery according to a comparative example.
Figure 5:
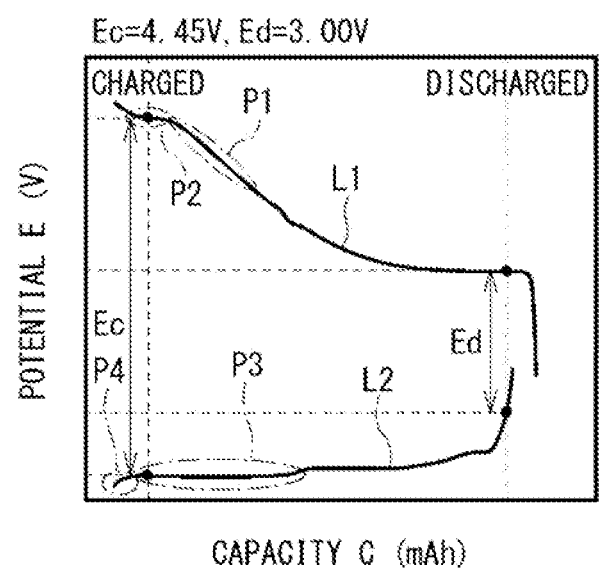
FIG. 5 is another capacity potential curve (charge voltage Ec=4.45 V) of the secondary battery according to the comparative example.
Figure 6:
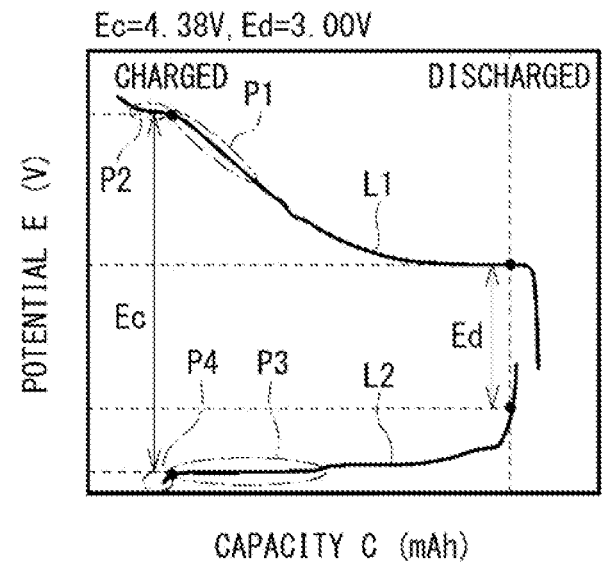
FIG. 6 is a capacity potential curve (charge voltage Ec=4.38 V) of a secondary battery according to an embodiment of the present technology.
Figure 7:
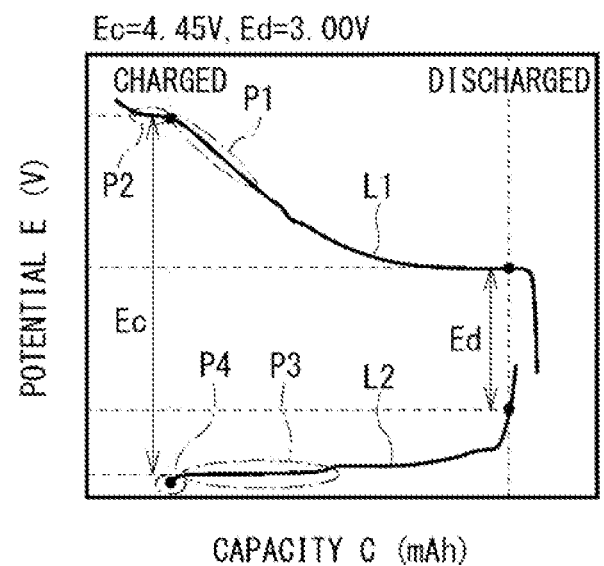
FIG. 7 is another capacity potential curve (charge voltage Ec=4.45 V) of the secondary battery according to an embodiment of the technology.

A charge and discharge principle and configuration conditions of the secondary battery of the embodiment will now be described. FIGS. 4 and 5 each represent a capacity potential curve related to a secondary battery according to a comparative example of the secondary battery according to the embodiment. FIGS. 6 and 7 each represent a capacity potential curve related to the secondary battery according to the embodiment.

In each of FIGS. 4 to 7, a horizontal axis represents a capacity C (mAh) and a vertical axis represents a potential E (V). The potential E is an open circuit potential to be measured with lithium metal as a reference electrode, i.e., a potential versus a lithium reference electrode. FIGS. 4 to 7 each indicate a capacity potential curve L1 of the positive electrode 13 and a capacity potential curve L2 of the negative electrode 14. It should be understood that a position of a dashed line indicated as "charged" represents a full charge state, and a position of a dashed line indicated as "discharged" represents a full discharge state.

A charge voltage Ec (V) and a discharge voltage Ed (V) are, for example, set as follows. In FIG. 4, the charge voltage Ec is set to 4.30 V and the discharge voltage Ed is set to 3.00 V. In FIG. 5, the charge voltage Ec is set to 4.45 V and the discharge voltage Ed is set to 3.00 V. In FIG. 6, the charge voltage Ec is set to 4.38 V and the discharge voltage Ed is set to 3.00 V. In FIG. 7, the charge voltage Ec is set to 4.45 V and the discharge voltage Ed is set to 3.00 V. Upon charging and discharging, the secondary battery is charged until a battery voltage (a closed circuit voltage) reaches the charge voltage Ec and then discharged until the battery voltage reaches the discharge voltage Ed.

In the following, a description is given of a premise for describing the charge and discharge principle and the configuration conditions of the secondary battery according to the embodiment. Thereafter, the charge and discharge principle and the configuration conditions for achieving the charge and discharge principle are described.

In order to improve an energy density of the secondary battery, it is conceivable to increase the charge voltage Ec (a so-called end-of-charge voltage). Increase in the charge voltage Ec raises a potential E of the positive electrode 13 in an end stage of charging, and by extension at an end of charging, which causes increase in a use range of the potential E, i.e., a potential range to be used in the positive electrode 13 during charging.

In a case where the layered rock-salt lithium-cobalt composite oxide is used as the positive electrode active material, a potential constant region P2 associated with a phase transition (O3/H1-3 transition) generally exists. Increase in the charge voltage Ec increases the potential E of the positive electrode 13 in the end stage of charging, which causes the potential E of the positive electrode 13 to reach inside the potential constant region P2 described above. Accordingly, the capacity potential curve L1 of the positive electrode 13 has a potential varying region P1 and the potential constant region P2 as indicated in FIGS. 4 to 7. The potential varying region P1 is a region in which the potential E varies as the capacity C varies. The potential constant region P2 is a region in the capacity potential curve located to the left of the potential constant region P1 and is a region in which the potential E hardly varies even if the capacity C varies as a result of the phase transition.

If the secondary battery including the layered rock-salt lithium-cobalt composite oxide is charged and discharged in such a manner that the potential E of the positive electrode 13 reaches inside the potential constant region P2 associated with the phase transition, or the potential E of the positive electrode 13 passes through the potential constant region P2 associated with the phase transition, a capacity loss relatively easily occurs and gas generation also relatively easily occurs. Such tendencies are relatively strong when the secondary battery is used and stored in a high-temperature environment. In particular, if the charge voltage Ec is 4.38 V or higher, the potential E of the positive electrode 13 becomes easier to reach the potential constant region P2 associated with the phase transition, or the potential E of the positive electrode 13 becomes easier to pass through the potential constant region P2 associated with the phase transition.

In contrast, if the charge voltage Ec is increased in a case where graphite is used as the negative electrode active material, a two-phase coexistence reaction of an intercalation compound stage 1 and an interlayer compound stage 2 proceeds in the graphite. As a result, the capacity potential curve L2 of the negative electrode 14 has a potential constant region P3 as indicated in FIGS. 4 to 7. The potential constant region P3 is a region in which the potential E hardly varies even if the capacity C varies in association with the two-phase coexistence reaction. The potential E of the negative electrode 14 in the potential constant region P3 is about 100 mV.

It should be understood that, if the charge voltage Ec is further increased, the potential E of the negative electrode 14 exceeds the potential constant region P3, and thus the potential E varies markedly. In association with the increase in the charge voltage Ec that causes the potential E to exceed the potential constant region P3, the capacity potential curve L2 of the negative electrode 14 has a potential varying region P4, as indicated in FIGS. 4 to 7. In FIGS. 4 to 7, the potential varying region P4 is a region located on a lower potential side compared with the potential constant region P3 in the capacity potential curve, and is a region in which the potential E markedly varies (decreases) if the capacity C varies. The potential E of the negative electrode 14 in the potential varying region P4 is lower than about 100 mV.

In the secondary battery according to the embodiment in which the positive electrode 13 includes the positive electrode active material (the layered rock-salt lithium-cobalt composite oxide) and the negative electrode 14 includes the negative electrode active material (graphite), charging and discharging are performed as described below on the basis of the premise described above. In the following, the charge and discharge principle of the secondary battery according to the embodiment (FIGS. 6 and 7) will be described, compared with the charge and discharge principle of the secondary battery according to the comparative example (FIGS. 4 and 5).

In the secondary battery according to the comparative example, as indicated in FIG. 4, the potential E of the negative electrode 14 at the end of charging (charge voltage Ec=4.30 V) is set to cause the charging to be completed in the potential constant region P3, in order to prevent a battery capacity from decreasing due to precipitation of lithium metal on the negative electrode 14.

However, in a case where the charge voltage Ec of the secondary battery according to the comparative example is increased to 4.38 V or higher, more specifically, to 4.45 V, the potential E of the positive electrode 13 reaches 4.50 V or higher as indicated in FIG. 5 in association with the increase in the potential E of the negative electrode 14 at the end of charging. As a result, the potential E of the positive electrode 13 at the end of charging (charge voltage Ec=4.45 V) reaches the potential constant region P2 associated with the phase transition or passes through the potential constant region P2 associated with the phase transition.

Thus, in the secondary battery according to the comparative example, the increase in the charge voltage Ec to 4.38 V or higher makes it easier for the potential E of the positive electrode 13 to reach the potential constant region P2 associated with the phase transition, or for the potential E of the positive electrode 13 to pass through the potential constant region P2 associated with the phase transition. As a result, the capacity loss relatively easily occurs, and the gas generation also relatively easily occurs, making it easier to deteriorate a cyclability characteristic and a swelling characteristic. As described above, the tendency that the cyclability characteristic and the swelling characteristic easily deteriorate becomes relatively strong when the secondary battery is used and stored in a high-temperature environment.

Moreover, in the secondary battery according to the comparative example, the battery capacity is easily influenced by, for example, an active material ratio (a ratio between an amount of the positive electrode active material and an amount of the negative electrode active material) and the charge voltage Ec. Thus, the battery capacity easily varies in association with, for example, variation in the active material ratio (amount) and a setting error of the charge voltage Ec by a charging device. Accordingly, the variation in the capacity C of the positive electrode 13 makes it easier for the potential E of the positive electrode 13 to reach the potential constant region P2 associated with the phase transition, or the potential E of the positive electrode 13 to pass through the potential constant region P2 associated with phase transition. As a result, the battery capacity easily varies, and an operable time of, for example, an apparatus or a device that operates using the secondary battery as a power source is shortened due to decrease in the battery capacity. In addition, if the battery capacity varies, lithium metal is generated on the negative electrode 14 more easily.

In contrast, in the secondary battery according to the embodiment, the potential E of the negative electrode 14 is set to help to prevent the potential E of the positive electrode 13 (the layered rock-salt lithium-cobalt composite oxide) from reaching the potential constant region P2 associated with the phase transition or the potential E of the positive electrode 13 from passing through the potential constant region P2 associated with the phase transition, and also to suppress the precipitation of lithium metal on the negative electrode 14. Specifically, as indicated in FIG. 6, the potential E of the negative electrode 14 at the end of charging (charge voltage Ec=4.38 V) is set to cause the charging not to be completed in the potential constant region P3 and to be completed in the potential varying region P4. Further, as indicated in FIG. 7, the potential E of the negative electrode 14 at the end of charging (charge voltage Ec=4.45 V) is similarly set to cause the charging not to be completed in the potential constant region P3 and to be completed in the potential varying region P4.

In this case, because the potential E of the negative electrode 14 at the end of charging decreases, the potential E of the positive electrode 13 at the end of charging also decreases. Specifically, in the secondary battery according to the embodiment, the potential E of the positive electrode 13 does not reach 4.50 V or higher even if the charge voltage Ec is increased to 4.38 V or higher, more specifically to 4.45 V, as indicated in FIGS. 6 and 7, in association with the decrease in the potential E of the negative electrode 14 at the end of charging. Thus, the potential E of the positive electrode 13 at the end of charging (charge voltage Ec=4.38 V or 4.45 V) is set not to reach the potential constant region P2 associated with the phase transition, or not to pass through the potential constant region P2 associated with the phase transition.

Upon charging, as is apparent from FIGS. 6 and 7, when the secondary battery is charged up to the charge voltage Ec of 4.38 V or higher, the potential E of the negative electrode 14 markedly decreases in the potential varying region P4, and thus a charging reaction is completed. Thus, the potential E of the positive electrode 13 is controlled in the end stage of charging as described above, which prevents the potential E of the positive electrode 13 from easily reaching the potential constant region P2 associated with the phase transition, or prevents the potential E of the positive electrode 13 from easily passing through the potential constant region P2 associated with the phase transition. In addition, if the potential E of the negative electrode 14 markedly decreases in the potential varying region P4, the charging reaction is immediately terminated. This prevents the charging reaction from proceeding to an extent where the precipitation of lithium metal occurs on the negative electrode 14.

Accordingly, in the secondary battery according to the embodiment, even if the charge voltage Ec is increased to 4.38 V or higher, the potential E of the positive electrode 13 is prevented from easily reaching the potential constant region P2 associated with the phase transition, or the potential E of the positive electrode 13 is prevented from easily passing through the potential constant region P2 associated with the phase transition. As a result, the capacity loss is relatively suppressed, and the gas generation is also relatively suppressed. In addition, even if the charge voltage Ec is increased to 4.38 V or higher, the precipitation of lithium metal is suppressed on the negative electrode 14, which suppresses decrease in the battery capacity.

Moreover, in the secondary battery according to the embodiment, the battery capacity is less influenced by, for example, an active material ratio and the charge voltage Ec. This helps to suppress variation in the battery capacity, and secures the operable time of, for example, an apparatus or a device that operates using the secondary battery as a power source. In addition, even if the battery capacity varies, generation of lithium metal is suppressed on the negative electrode 14.

In the secondary battery according to the embodiment, configuration conditions described below are satisfied, in order to achieve the charge and discharge principle described above, i.e., in order to help to prevent the potential E of the positive electrode 13 (the layered rock-salt lithium-cobalt composite oxide) from reaching the potential constant region P2 associated with the phase transition or the potential E of the positive electrode 13 from passing through the potential constant region P2 associated with the phase transition.

A state in which the secondary battery is charged with a constant voltage of a closed circuit voltage (CCV) of higher than or equal to 4.38 V for 24 hours is referred to as a full charge state. Further, a discharge capacity obtained when the secondary battery is discharged with a constant current from the full charge state until a closed circuit voltage reaches 3.00 V, following which the secondary battery is discharged with a constant voltage of the closed circuit voltage of 3.00 V for 24 hours is referred to as a maximum discharge capacity (mAh). In this case, when the secondary battery is discharged from the full charge state by a capacity corresponding to 1% of the maximum discharge capacity, a variation of the potential E of the positive electrode 13, i.e., a positive electrode potential variation Ew, represented by Formula (2) is greater than or equal to 2 mV. As is apparent from Formula (2), the positive electrode potential variation Ew is a difference between a potential E1 (a first positive electrode potential) and a potential E2 (a second positive electrode potential). It should be understood that the current value at the time of discharging the secondary battery from the full charge state until the closed circuit voltage reaches 3.00 V is not particularly limited and may be set to any value as long as the current value is within a general range, because the secondary battery is discharged with a constant voltage for 24 hours.

$$\text{Positive electrode potential variation } Ew(mV) = \text{potential } E1(mV) - \text{potential } E2(mV) \quad (2)$$

where:
the potential E1 is an open circuit potential (versus a lithium reference electrode) of the positive electrode 13 measured in the secondary battery in the full charge state; and the potential E2 is an open circuit potential (versus a lithium reference electrode) of the positive electrode 13 measured in the secondary battery in a state in which the secondary battery is discharged from the full charge state by the capacity corresponding to 1% of the maximum discharge capacity.

That is, as described above, in the secondary battery according to the embodiment where the potential E of the positive electrode 13 is set to cause the charging to be completed in the potential varying region P1, the potential E of the positive electrode 13 sufficiently decreases upon discharging the secondary battery in the full charge state by the capacity corresponding to 1% of the maximum discharge capacity, as is apparent from FIGS. 6 and 7. Thus, the potential E (E2) of the positive electrode 13 after the discharging is sufficiently reduced as compared with the potential E (E1) of the positive electrode 13 before the discharging (the full charge state). Accordingly, the positive electrode potential variation Ew, which is the difference between the potential E1 and the potential E2, is 2 mV or greater as described above.

In contrast, as described above, in the secondary battery according to the comparative example in which the potential E of the positive electrode 13 is set to reach the potential constant region P2 associated with the phase transition, or to pass through the potential constant region P2 associated with the phase transition, the potential E of the positive electrode 13 hardly varies upon discharging the secondary battery in the full charge state by the capacity corresponding to 1% of the maximum discharge capacity, as is apparent from FIGS. 4 and 5. Thus, the potential E (E2) of the positive electrode 13 after the discharging is substantially the same as the potential E (E1) of the positive electrode 13 before the discharging (the full charge state). Accordingly, the positive electrode potential variation Ew, which is the difference between the potential E1 and the potential E2, is less than 2 mV.

In a case where the configuration condition (the positive electrode potential variation Ew) is satisfied, the potential E (a negative electrode potential Ef) of the negative electrode 14 measured in the secondary battery in the full charge state is preferably lower than or equal to 95 mV, and more preferably from 3 mV to 95 mV both inclusive, in order to suppress the precipitation of lithium metal on the negative electrode 14.

That is, in the secondary battery according to the embodiment in which the potential E of the negative electrode 14 is set to cause the charging not to be completed in the potential constant region P3 and to be completed in the potential varying region P4, when the secondary battery is charged until the charge voltage Ec reaches 4.38 V or higher, the negative electrode potential Ef is lower than about 100 mV and is more specifically lower than or equal to 95 mV, as illustrated in FIGS. 6 and 7.

In contrast, in the secondary battery according to the comparative example in which the potential E of the negative electrode 14 is set to cause the charging to be completed in the potential constant region P3, when the secondary battery is charged until the charge voltage Ec reaches 4.38 V or higher, as is apparent from FIGS. 4 and 5, the potential E of the negative electrode 14 is high as compared with the case where the potential E of the negative electrode 14 is set to cause the charging to be completed in the potential varying region P4. Thus, the negative electrode potential Ef is higher than or equal to about 100 mV.

The secondary battery according to the embodiment operates as follows, for example. Upon charging the secondary battery, lithium ions are extracted from the positive electrode 13, and the extracted lithium ions are inserted into the negative electrode 14 via the electrolytic solution. Upon discharging the secondary battery, lithium ions are extracted from the negative electrode 14, and the extracted lithium ions are inserted into the positive electrode 13 via the electrolytic solution.

In a case of manufacturing the secondary battery according to the embodiment, the positive electrode 13 and the negative electrode 14 are fabricated and thereafter the secondary battery is assembled using the positive electrode 13 and the negative electrode 14, for example, as described below.

First, the positive electrode active material including the layered rock-salt lithium-cobalt composite oxide is mixed with materials including, without limitation, the positive electrode binder and the positive electrode conductor on an as-needed basis to thereby obtain a positive electrode mixture. Thereafter, the positive electrode mixture is dispersed or dissolved into a solvent such as an organic solvent to thereby prepare a paste positive electrode mixture slurry. Lastly, the positive electrode mixture slurry is applied on both sides of the positive electrode current collector 13A, following which the applied positive electrode mixture slurry is dried to thereby form the positive electrode active material layers 13B. Thereafter, the positive electrode active material layers 13B may be compression-molded by means of a machine such as a roll pressing machine. In this case, the positive electrode active material layers 13B may be heated. The positive electrode active material layers 13B may be compression-molded a plurality of times.

The negative electrode active material layers 14B are formed on both sides of the negative electrode current collector 14A by a procedure similar to the fabrication procedure of the positive electrode 13 described above. Specifically, the negative electrode active material including graphite is mixed with materials including, without limitation, the negative electrode binder and the negative electrode conductor on an as-needed basis to thereby obtain a negative electrode mixture. Thereafter, the negative electrode mixture is dispersed or dissolved into a solvent such as an organic solvent or an aqueous solvent to thereby prepare a paste negative electrode mixture slurry. Thereafter, the negative electrode mixture slurry is applied on both sides of the negative electrode current collector 14A, following which the applied negative electrode mixture slurry is dried to thereby form the negative electrode active material layers 14B. Thereafter, the negative electrode active material layers 14B may be compression-molded.

In the case of fabricating the positive electrode 13 and the negative electrode 14, a mixture ratio between the positive electrode active material and the negative electrode active material (a relationship between mass of the positive electrode active material and mass of the negative electrode active material) is adjusted in such a manner that the mass of the positive electrode active material is sufficiently greater, to thereby satisfy the above-described configuration conditions (the positive electrode potential variation Ew, the negative electrode potential Ef, etc.).

First, the positive electrode lead 11 is coupled to the positive electrode 13 (the positive electrode current collector 13A) by a method such as a welding method, and the negative electrode lead 12 is coupled to the negative electrode 14 (the negative electrode current collector 14A) by a method such as a welding method. Thereafter, the positive electrode 13 and the negative electrode 14 are stacked on each other with the separator 15 interposed therebetween, following which the positive electrode 13, the negative electrode 14, and the separator 15 are wound to thereby form a wound body. In this case, an unillustrated jig having an elongated shape is used to wind the positive electrode 13, the negative electrode 14, and the separator 15 about the winding axis J to thereby cause the wound body to be in the elongated shape as illustrated in FIG. 1.

Thereafter, the outer package member 20 is folded in such a manner as to sandwich the wound electrode body 10, following which the outer edges excluding one side of the outer package member 20 are bonded to each other by a method such as a thermal fusion bonding method. Thus, the wound body is placed into the pouch-shaped outer package member 20. Lastly, the electrolytic solution is injected into the pouch-shaped outer package member 20, following which the outer package member 20 is sealed by a method such as a thermal fusion bonding method. In this case, the sealing film 31 is disposed between the outer package member 20 and the positive electrode lead 11, and the sealing film 32 is disposed between the outer package member 20 and the negative electrode lead 12. The wound body is thereby impregnated with the electrolytic solution, forming the wound electrode body 10. Thus, the wound electrode body 10 is housed in the outer package member 20. As a result, the secondary battery is completed.

According to the secondary battery of the embodiment, in a case where the positive electrode 13 includes the positive electrode active material (the lithium-cobalt composite oxide) and where the negative electrode 14 includes the negative electrode active material (graphite), the above-described configuration condition (the positive electrode potential variation Ew) is satisfied. In this case, as compared with the case where the configuration condition is not satisfied, even if the charge voltage Ec is increased to 4.38 V or higher, the potential E of the positive electrode 13 is prevented from easily reaching the potential constant region P2 associated with the phase transition, or the potential E of the positive electrode 13 is prevented from easily passing through the potential constant region P2 associated with the phase transition, as described above. As a result, the capacity loss of the positive electrode 13 is suppressed and the gas generation is also suppressed. Accordingly, it is possible to achieve a superior cyclability characteristic and a superior swelling characteristic.

In particular, the negative electrode potential Ef may be lower than or equal to 95 mV. This decreases the potential E of the positive electrode 13 at the end of charging, making it easier to control the potential E of the positive electrode 13 in such a manner that the potential E of the positive electrode 13 is further prevented from easily reaching the potential constant region P2 associated with the phase transition, or is further prevented from easily passing through the potential constant region P2 associated with the phase transition. In addition, the charging reaction is prevented from proceeding to an extent where the precipitation of lithium metal occurs on the negative electrode 14 in the end stage of charging, which suppresses the precipitation of lithium metal on the negative electrode 14. Accordingly, it is possible to achieve a further superior cyclability characteristic.

Further, the solvent of the electrolytic solution may include the chain carboxylate ester together with the carbonate ester, the lactone, or both, and the proportion of the chain carboxylate ester may be from 10 vol % to 80 vol % both inclusive. This improves the diffusing property of the lithium ions. Accordingly, the precipitation of lithium metal is suppressed on the negative electrode 14, which makes it possible to achieve a further superior cyclability characteristic.

In this case, the chain carboxylate ester may include, without limitation, the acetate ester, and the molecular weight of the chain carboxylate ester may be less than or equal to 119. This improves the ionic conductivity of the lithium ions, which makes it possible to achieve an even further superior cyclability characteristic. Further, the solvent of the electrolytic solution may include the dinitrile compound, and the content of the dinitrile compound in the electrolytic solution may be from 1 wt % to 20 wt % both inclusive. This increases the oxidation resistance of the chain carboxylate ester. Accordingly, the decomposition of the chain carboxylate ester upon charging and discharging is suppressed, which makes it possible to achieve an even further superior swelling characteristic.

The configurations of the secondary batteries described above are appropriately modifiable as described below. It should be understood that any two or more of the following series of modifications may be combined.

Figure 8:
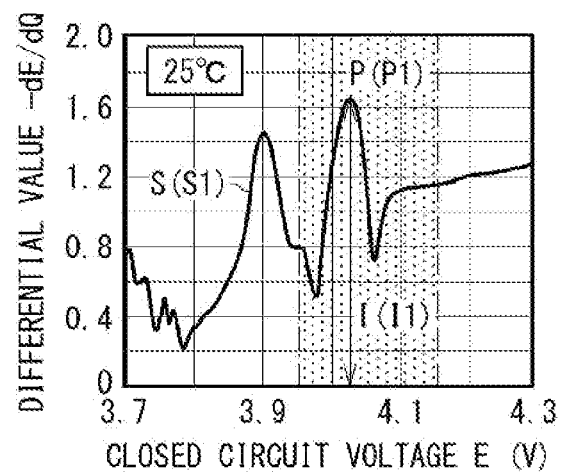
FIG. 8 is a graph of an example of a correlative relationship (at a temperature at a time of discharging of 25° C.) between a closed circuit voltage and a differential value related to a secondary battery according to an embodiment of the present technology.
Figure 9:
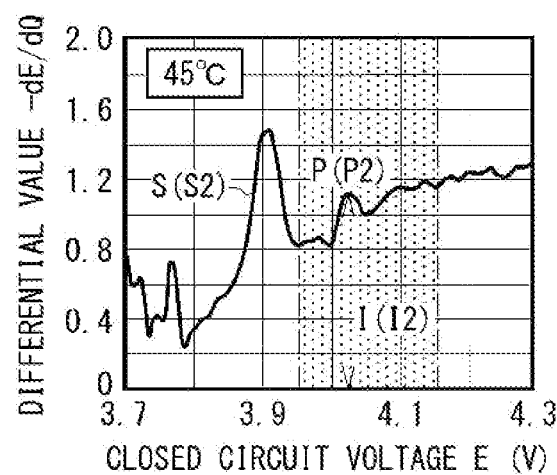
FIG. 9 is a graph of an example of a correlative relationship (at a temperature at a time of discharging of 45° C.) between the closed circuit voltage and the differential value related to the secondary battery according to an embodiment of the present technology.

FIG. 8 is a graph of an example of a correlative relationship (at a temperature at the time of discharging of 25° C.) between a closed circuit voltage E (V) and a differential value −dE/dQ related to a secondary battery according to Modification 1. FIG. 9 is a graph of an example of a correlative relationship (at a temperature at the time of discharging of 45° C.) between the closed circuit voltage E (V) and the differential value −dE/dQ related to the secondary battery according to Modification 1.

FIGS. 8 and 9 each indicate the correlative relationship between the differential value −dE/dQ and the closed circuit voltage E upon discharging the secondary battery including the positive electrode 13 that includes the positive electrode active material (the layered rock-salt lithium-cobalt composite oxide) and the negative electrode 14 that includes the negative electrode active material (graphite). The differential value −dE/dQ is determined by differentiating the battery voltage (the closed circuit voltage E) with respect to a discharge capacity Q. That is, FIGS. 8 and 9 each indicate a correlation curve S in which the differential values −dE/dQ are plotted with respect to the closed circuit voltages E.

As illustrated in FIGS. 8 and 9, each of the correlation curves S has a peak P in a range in which the closed circuit voltage E is from 3.95 V to 4.15 V both inclusive (from 4.05 V to 4.20 V both inclusive versus a lithium reference electrode). The peak P is a peak that occurs owing to reversible change in the crystal structure of the layered rock-salt lithium-cobalt composite oxide around a lithium site in accordance with a temperature variation. Accordingly, an intensity I of the peak P, i.e., a maximum value of the differential value −dE/dQ at the peak P, varies in accordance with the temperature at the time of discharging. Specifically, the intensity I of the peak P increases as the temperature at the time of discharging becomes lower, and decreases as the temperature at the time of discharging becomes higher. In each of FIGS. 8 and 9, shading is applied to a range in which the closed circuit voltage E is from 3.95 V to 4.15 V both inclusive.

Here, attention is paid to the following peaks: a peak P (a peak P1 illustrated in FIG. 8) to be detected when the temperature at the time of discharging is 25° C.; and a peak P (a peak P2 illustrated in FIG. 9) to be detected when the temperature at the time of discharging is 45° C. In this case, a ratio (an intensity ratio) I2/I1 of an intensity I (I2) of the peak P2 to an intensity I (I1) of the peak P1 is preferably less than or equal to 0.71. A reason for this is that the crystal structure of the layered rock-salt lithium-cobalt composite oxide is optimized, which suppresses the capacity loss due to the crystal structure change even if charging and discharging are repeated. The respective values of the intensities I1 and I2 and the intensity ratio I2/I1 are each rounded off to the nearest hundredth.

A procedure for determining the intensity ratio I2/I1 is as follows, for example. First, the secondary battery is put into a thermostatic chamber (at a temperature of 25° C.), and is thereafter left to stand (for a leaving time of 1 hour). Thereafter, the secondary battery is repeatedly charged and discharged in the thermostatic chamber. Upon charging, the secondary battery is charged with a current of 0.5 C until the closed circuit voltage E reaches 4.5 V, following which the charging of the secondary battery is stopped for 3 hours. Upon discharging, the secondary battery is discharged by a capacity of 1/200 of a rated capacity, following which the discharging of the secondary battery is stopped for 1 hour. The charging and discharging are thereby repeated until the closed circuit voltage E after the discharging becomes less than or equal to 3.0 V. 0.5 C is a value of a current that causes a battery capacity (a theoretical capacity) to be completely discharged in 2 hours. In this case, the closed circuit voltage E and the discharge capacity Q are each measured each time the discharging of the secondary battery is stopped. Thereafter, the closed circuit voltage E is plotted with respect to the discharge capacity Q to thereby acquire a closed circuit voltage curve with respect to the discharge capacity Q. Thereafter, the closed circuit voltage E is differentiated with respect to the discharge capacity Q to thereby calculate the differential value dE/dQ, following which the differential value −dE/dQ to which the minus sign is attached is plotted with respect to the closed circuit voltage E, thereby acquiring the correlation curve S (S1) illustrated in FIG. 8. Thereafter, the intensity I1 of the peak P1 is determined on the basis of the correlation curve S1. Thereafter, the correlation curve S (S2) illustrated in FIG. 9 is acquired by a procedure similar to the above-described procedure for acquiring the correlation curve S1 except that the temperature of the thermostatic chamber is changed to 45° C., following which the intensity I2 of the peak P2 is determined on the basis of the correlation curve S2. Lastly, the intensity ratio I2/I1 is calculated on the basis of the intensities I1 and I2.

In this case, the positive electrode 13 (the positive electrode active material layer 13B) preferably includes two kinds of positive electrode active material particles (large-diameter particles and small-diameter particles). The large-diameter particles serve as first positive electrode active material particles each including the layered rock-salt lithium-cobalt composite oxide and have a relatively large average particle diameter (a median diameter D50 of from 10 μm to 40 μm both inclusive). The small-diameter particles serve as second positive electrode active material particles each including the layered rock-salt lithium-cobalt composite oxide and have a relatively small average particle diameter (a median diameter D50 of from 1 μm to 10 μm both inclusive). A reason why the two kinds of positive electrode active material particles (the large-diameter particles and the small-diameter particles) are used is that a volume energy density increases.

The lithium-cobalt composite oxide included in each of the large-diameter particles preferably includes magnesium and zirconium as constituent elements. Further, it is preferable that the lithium-cobalt composite oxide included in each of the second positive electrode active material particles include magnesium and titanium as constituent elements, and it is more preferable that a portion of or all of the magnesium and a portion of or all of the titanium form magnesium titanate ($MgTiO_3$). A reason for this is that the crystal structure is prevented from being easily changed on surfaces of the large-diameter particles.

Also in this case, a superior cyclability characteristic is obtainable by satisfying the above-described configuration condition (the positive electrode potential variation Ew). In this case, in particular, the optimization of the crystal structure of the layered rock-salt lithium-cobalt composite oxide suppresses the occurrence of the capacity loss even if charging and discharging are repeated as described above, which makes it possible to achieve a further superior cyclability characteristic.

Figure 10:
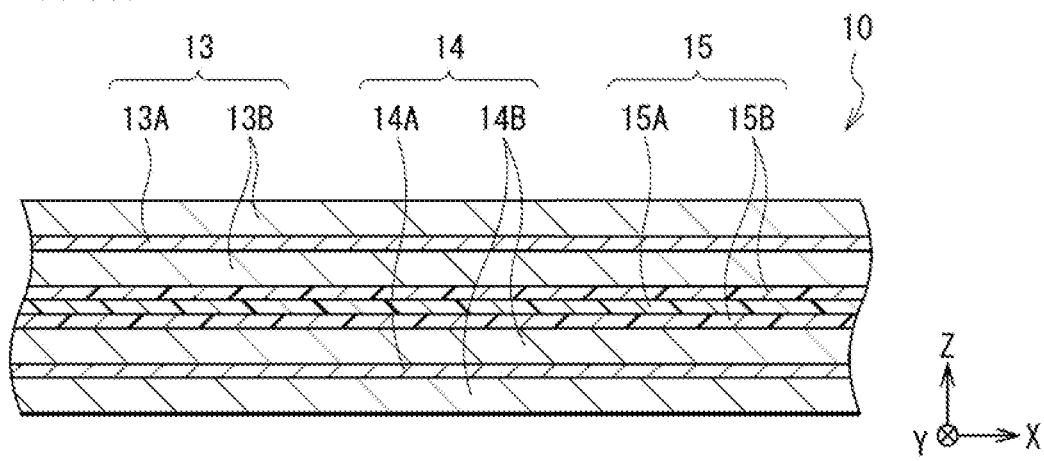
FIG. 10 is a sectional view of a configuration of a secondary battery according to an embodiment of the present technology.

FIG. 10 illustrates a sectional configuration of a secondary battery (the wound electrode body 10) of Modification 2, and corresponds to FIG. 3. As illustrated in FIG. 10, the separator 15 may include, for example, a base layer 15A and a polymer compound layer 15B provided on the base layer 15A. The polymer compound layer 15B may be provided on only one side of the base layer 15A, or on each of both sides of the base layer 15A. FIG. 10 illustrates a case where the polymer compound layer 15B is provided on each of both sides of the base layer 15A, for example.

The base layer 15A is, for example, the porous film described above. The polymer compound layer 15B includes, for example, a polymer compound such as polyvinylidene difluoride, because such a polymer compound has superior physical strength and is electrochemically stable. It should be understood that the polymer compound layer may include insulating particles such as inorganic particles. A reason for this is that safety improves. The inorganic particles are not limited to a particular kind, and examples thereof include aluminum oxide and aluminum nitride.

In a case of fabricating the separator 15, for example, a precursor solution that includes materials including, without limitation, the polymer compound and an organic solvent is prepared to thereby apply the precursor solution on each of both sides of the base layer 15A. Thereafter, the precursor solution is dried to thereby form the polymer compound layers 15B.

Also in this case, a superior cyclability characteristic is obtainable by satisfying the above-described configuration condition (the positive electrode potential variation Ew). In particular, adherence of the separator 15 to the positive electrode 13 is improved and adherence of the separator 15 to the negative electrode 14 is improved, suppressing distortion of the wound electrode body 10. This suppresses a decomposition reaction of the electrolytic solution and also suppresses leakage of the electrolytic solution with which the base layer 15A is impregnated, making it possible to achieve a further superior cyclability characteristic.

Figure 11:
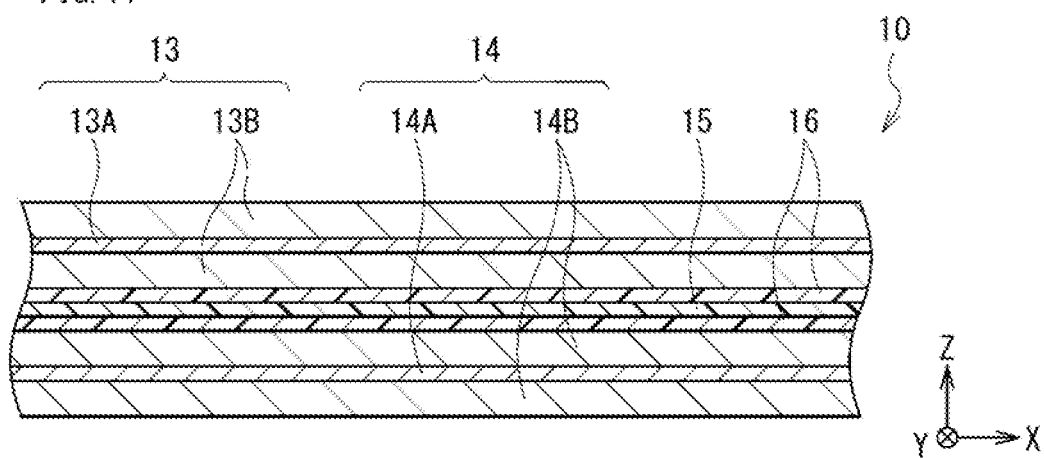
FIG. 11 is a sectional view of a configuration of a secondary battery according to an embodiment of the present technology.

FIG. 11 illustrates a sectional configuration of a secondary battery (the wound electrode body 10) of Modification 3, and corresponds to FIG. 3. As illustrated in FIG. 11, the wound electrode body 10 may include, for example, an electrolyte layer 16 which is a gel electrolyte instead of the electrolytic solution which is a liquid electrolyte.

As illustrated in FIG. 11, in the wound electrode body 10, the positive electrode 13 and the negative electrode 14 are stacked with the separator 15 and the electrolyte layer 16 interposed therebetween, and the stack of the positive electrode 13, the negative electrode 14, the separator 15, and the electrolyte layer 16 is wound, for example. The electrolyte layer 16 is interposed, for example, between the positive electrode 13 and the separator 15, and between the negative electrode 14 and the separator 15. However, the electrolyte layer 16 may be interposed only between the positive electrode 13 and the separator 15 or only between the negative electrode 14 and the separator 15.

The electrolyte layer 16 includes a polymer compound together with the electrolytic solution. As described above, the electrolyte layer 16 described here is the gel electrolyte; thus, the electrolytic solution is held by the polymer compound in the electrolyte layer 16. A configuration of the electrolytic solution is as described above. Regarding the electrolyte layer 16 which is the gel electrolyte, the concept of the solvent included in the electrolytic solution is broad and encompasses not only a liquid material but also an ion-conductive material that is able to dissociate the electrolyte salt. Accordingly, the ion-conductive polymer compound is also encompassed by the solvent. The polymer compound includes, for example, a homopolymer, a copolymer, or both. Examples of the homopolymer include polyvinylidene difluoride. Examples of the copolymer include a copolymer of vinylidene fluoride and hexafluoropyrene.

In a case of forming the electrolyte layer 16, for example, a precursor solution that includes materials including, without limitation, the electrolytic solution, the polymer compound, and an organic solvent is prepared to thereby apply the precursor solution on each of the positive electrode 13 and the negative electrode 14, following which the applied precursor solution is dried.

Also in this case, a superior cyclability characteristic is obtainable by satisfying the above-described configuration condition (the positive electrode potential variation Ew). In particular, this case suppresses leakage of the electrolytic solution, making it possible to achieve a further superior cyclability characteristic.

The applications of the secondary battery are not particularly limited as long as they are, for example, machines, apparatuses, instruments, devices, or systems (assembly of a plurality of apparatuses, for example) in which the secondary battery is usable as a driving power source, an electric power storage source for electric power accumulation, or any other source. The secondary battery used as a power source may serve as a main power source or an auxiliary power source. The main power source is preferentially used regardless of the presence of any other power source. The auxiliary power source may be used in place of the main power source, or may be switched from the main power source on an as-needed basis. In a case where the secondary battery is used as the auxiliary power source, the kind of the main power source is not limited to the secondary battery.

Specific examples of the applications of the secondary battery include: electronic apparatuses including portable electronic apparatuses; portable life appliances; storage devices; electric power tools; battery packs mountable on laptop personal computers or other apparatuses as a detachable power source; medical electronic apparatuses; electric vehicles; and electric power storage systems. Examples of the electronic apparatuses include video cameras, digital still cameras, mobile phones, laptop personal computers, cordless phones, headphone stereos, portable radios, portable televisions, and portable information terminals. Examples of the portable life appliances include electric shavers. Examples of the storage devices include backup power sources and memory cards. Examples of the electric power tools include electric drills and electric saws. Examples of the medical electronic apparatuses include pacemakers and hearing aids. Examples of the electric vehicles include electric automobiles including hybrid automobiles. Examples of the electric power storage systems include home battery systems for accumulation of electric power for emergency. Needless to say, the secondary battery may have applications other than those described above.

EXAMPLES

A description is given of Examples of the technology below.

Experiment Examples 1-1 to 1-15

Laminated secondary batteries (lithium-ion secondary batteries) illustrated in FIGS. 1 and 2 were fabricated, following which the cyclability characteristic and the swelling characteristic of the secondary batteries were evaluated as described below.

In a case of fabricating the positive electrode 13, first, 91 parts by mass of the positive electrode active material (lithium cobalt oxide ($LiCoO_2$) serving as the layered rock-salt lithium-cobalt composite oxide), 3 parts by mass of the positive electrode binder (polyvinylidene difluoride), and 6 parts by mass of the positive electrode conductor (graphite) were mixed with each other to thereby obtain a positive electrode mixture. Thereafter, the positive electrode mixture was put into an organic solvent (N-methyl-2-pyrrolidone), following which the organic solvent was stirred to thereby prepare a paste positive electrode mixture slurry. Thereafter, the positive electrode mixture slurry was applied on both sides of the positive electrode current collector 13A (a band-shaped aluminum foil having a thickness of 12 µm) by means of a coating apparatus, following which the applied positive electrode mixture slurry was dried to thereby form the positive electrode active material layers 13B. Lastly, the positive electrode active material layers 13B were compression-molded by means of a roll pressing machine.

In a case of fabricating the negative electrode 14, first, 97 parts by mass of the negative electrode active material (artificial graphite) and 1.5 parts by mass of the negative electrode binder (sodium carboxymethyl cellulose) were mixed with each other to thereby obtain a negative electrode mixture precursor. Thereafter, the negative electrode mixture precursor was put into an aqueous solvent (deionized water), following which 1.5 parts by mass, in terms of solid content, of the negative electrode binder (a styrene-butadiene-rubber dispersion liquid) was put into the aqueous solvent to thereby prepare a paste negative electrode mixture slurry. Thereafter, the negative electrode mixture slurry was applied on both sides of the negative electrode current collector 14A (a band-shaped copper foil having a thickness of 15 µm) by means of a coating apparatus, following which the applied negative electrode mixture slurry was dried to thereby form the negative electrode active material layers 14B. Lastly, the negative electrode active material layers 14B were compression-molded by means of a roll pressing machine.

In the case of fabricating the positive electrode 13 and the negative electrode 14, a mixture ratio (a weight ratio) between the positive electrode active material and the negative electrode active material was adjusted to thereby vary each of the positive electrode potential variation Ew (mV) and the negative electrode potential Ef (mV). Each of the positive electrode potential variation Ew and the negative electrode potential Ef in the case where the charge voltage Ec was set within a range from 4.38 V to 4.48 V both inclusive was as described in Table 1. Here, the maximum discharge capacity was set to 1950 mAh to 2050 mAh both inclusive.

In a case of preparing the electrolytic solution, the electrolyte salt (lithium hexafluorophosphate ($LiPF_6$)) was added to a solvent (ethylene carbonate (EC) serving as the cyclic carbonate ester and diethyl carbonate (DEC) serving as the chain carbonate ester), following which the solvent was stirred. In this case, a mixture ratio (a volume ratio) in the solvent of the cyclic carbonate ester to the chain carbonate ester was set to 20:80, and a content of the electrolyte salt with respect to the solvent was set to 1.2 mol/l (=1.2 mol/dm$^3$). Thereafter, another solvent (vinylene carbonate serving as the unsaturated cyclic carbonate ester) was added to the solvent, following which the solvent was stirred. In this case, a content of the unsaturated cyclic carbonate ester in the electrolytic solution was set to 1 wt %.

In a case of assembling the secondary battery, first, the positive electrode lead 11 including aluminum was welded to the positive electrode current collector 13A, and the negative electrode lead 12 including copper was welded to the negative electrode current collector 14A. Thereafter, the positive electrode 13 and the negative electrode 14 were stacked on each other with the separator 15 (a fine-porous polyethylene film having a thickness of 15 μm) interposed therebetween to thereby obtain a stacked body. Thereafter, the stacked body was wound, following which the protective tape was attached to a surface of the stacked body to thereby obtain a wound body.

Thereafter, the outer package member 20 was folded in such a manner as to sandwich the wound body, following which the outer edges of two sides of the outer package member 20 were thermal fusion bonded to each other. As the outer package member 20, an aluminum laminated film was used in which a surface protective layer (a nylon film having a thickness of 25 μm), a metal layer (an aluminum foil having a thickness of 40 μm), and a fusion-bonding layer (a polypropylene film having a thickness of 30 μm) were stacked in this order. In this case, the sealing film 31 (a polypropylene film having a thickness of 5 μm) was interposed between the outer package member 20 and the positive electrode lead 11, and the sealing film 32 (a polypropylene film having a thickness of 5 μm) was interposed between the outer package member 20 and the negative electrode lead 12.

Lastly, the electrolytic solution was injected into the outer package member 20 and thereafter, the outer edges of one of the remaining sides of the outer package member 20 were thermal fusion bonded to each other in a reduced-pressure environment. Thus, the wound body was impregnated with the electrolytic solution, thereby forming the wound electrode body 10 and sealing the wound electrode body 10 in the outer package member 20. As a result, the laminated secondary battery was completed.

Evaluation of cyclability characteristics (a high-temperature cyclability characteristic and a low-temperature cyclability characteristic) and a swelling characteristic (a high-temperature swelling characteristic) of the secondary batteries revealed the results described in Table 1.

First, the secondary battery was charged and discharged for one cycle in an ambient-temperature environment (at a temperature of 23° C.) in order to stabilize a state of the secondary battery. Upon charging, the secondary battery was charged with a constant current of 0.2 C until a battery voltage reached the charge voltage Ec (from 4.38 V to 4.48 V both inclusive) described in Table 1, and was thereafter charged with a constant voltage of the battery voltage corresponding to the charge voltage Ec until a current reached 0.05 C. Upon discharging, the secondary battery was discharged with a constant current of 0.2 C until a battery voltage reached the discharge voltage Ed (3.00 V). It should be understood that 0.2 C and 0.05 C are values of currents that cause battery capacities (theoretical capacities) to be completely discharged in 5 hours and 20 hours, respectively.

Thereafter, the secondary battery was stored (for a storing time of 5 hours) in the thermostatic chamber (at a temperature of 45° C.), following which the secondary battery was charged and discharged in the thermostatic chamber, to thereby measure a discharge capacity (a pre-cycle discharge capacity). Upon charging, the secondary battery was charged with a constant current of 0.7 C until a battery voltage reached the charge voltage Ec (from 4.40 V to 4.48 V both inclusive), and was thereafter charged with a constant voltage of the battery voltage corresponding to the charge voltage Ec until a current reached 0.03 C. Upon discharging, the secondary battery was discharged with a constant current of 0.2 C until a battery voltage reached the discharge voltage Ed (3.00 V). It should be understood that 0.7 C and 0.03 C are values of currents that cause battery capacities (theoretical capacities) to be completely discharged in 10/7 hours and 100/3 hours, respectively.

Lastly, the secondary battery was repeatedly charged and discharged in the thermostatic chamber, to thereby measure a discharge capacity (an each cycle discharge capacity) every time the secondary battery was charged and discharged. The secondary battery was charged and discharged with similar charging and discharging conditions except that the current at the time of discharging was changed to 1 C. It should be understood that 1 C is a value of a current that causes a battery capacity (a theoretical capacity) to be completely discharged in 1 hour. In this case, the number of cycles (the number of high-temperature cycles (cycle)) in which a high-temperature retention rate first became less than 80% was examined by calculating, every time the secondary battery was charged and discharged: high-temperature retention rate (%)=(each cycle discharge capacity/pre-cycle discharge capacity)×100.

In a case of examining the low-temperature cyclability characteristic, a procedure similar to the procedure for examining the high-temperature cyclability characteristic was performed except that the temperature inside the thermostatic chamber was changed to 0° C. and that the current at the time of repeatedly charging and discharging the secondary battery was changed to 0.2 C. In this case, the number of cycles (the number of low-temperature cycles (cycle)) in which a low-temperature retention rate first became less than 80% was examined by calculating, every time the secondary battery was charged and discharged: low-temperature retention rate (%)=(each cycle discharge capacity/pre-cycle discharge capacity)×100.

In a case of examining the high-temperature swelling characteristic, first, the state of the secondary battery was stabilized by the above procedures. Thereafter, the secondary battery was charged in an ambient-temperature environment (at a temperature of 23° C.), following which a thickness (a pre-storage thickness) of the secondary battery was measured using a caliper. Upon charging, the secondary battery was charged with a constant current of 0.7 C until the battery voltage reached the charge voltage Ec (from 4.40 V to 4.48 V both inclusive) described in Table 1, and was thereafter charged with a constant voltage of the battery voltage corresponding to the charge voltage Ec until the current reached 0.03 C.

Lastly, the following work was repeated: the secondary battery was stored (for a storing time of 100 hours) in the thermostatic chamber (at a temperature of 60° C.) and was thereafter cooled naturally in an ambient-temperature environment (at a temperature of 23° C.), following which a thickness (a post-storage thickness) of the secondary battery was measured using the caliper. In this case, a time (a high-temperature swelling time (hour)) taken for the high-temperature swelling rate to first reach greater than or equal to 10% was examined by calculating, every time the secondary battery was stored: high-temperature swelling rate (%)=[(post-storage thickness−pre-storage thickness)/pre-storage thickness]×100. The high-temperature swelling time is the time from a time point when the secondary battery was put into the thermostatic chamber to a time point when the high-temperature swelling rate first reached greater than or equal to 10%.

Here, a test secondary battery (lithium-ion secondary battery) of a coin type described below was used to thereby examine, as described in Table 1, the capacity characteristic (a capacity ratio) in addition to the cyclability characteristic and the swelling characteristic.

electrode capacity. Upon charging, the secondary battery was charged with a constant current of 0.1 C until a voltage reached 0 V, and was thereafter charged with the constant voltage of 0 V until a current reached 0.01 C. Upon discharging, the secondary battery was discharged with a constant current of 0.1 C until a voltage reached 1.5 V.

Lastly, the following was calculated: capacity ratio=negative electrode capacity/positive electrode capacity.

TABLE 1

| Experiment example | Charge voltage Ec (V) | Capacity ratio | Positive electrode potential variation Ew (mV) | Negative electrode potential Ef (mV) | Number of high-temperature cycles (cycle) | temperature Number of low-cycles (cycle) | High-temperature swelling time (hour) |
|---|---|---|---|---|---|---|---|
| 1-1 | 4.38 | 1.70 | 2 | 95 | 202 | 258 | 300 |
| 1-2 |  | 1.59 | 3 | 90 | 268 | 261 | 300 |
| 1-3 |  | 1.52 | 6 | 80 | 349 | 260 | 400 |
| 1-4 |  | 0.84 | 15 | 20 | 455 | 228 | 500 |
| 1-5 | 4.42 | 0.94 | 3 | 70 | 258 | 258 | 300 |
| 1-6 | 4.45 | 0.92 | 3 | 40 | 265 | 239 | 300 |
| 1-7 | 4.47 | 0.92 | 3 | 20 | 248 | 237 | 300 |
| 1-8 | 4.48 | 0.94 | 2 | 15 | 200 | 216 | 300 |
| 1-9 |  | 0.91 | 3 | 10 | 243 | 201 | 300 |
| 1-10 |  | 0.89 | 5 | 3 | 351 | 150 | 400 |
| 1-11 | 4.38 | 1.74 | 1 | 100 | 82 | 63 | 100 |
| 1-12 | 4.42 | 1.02 | 1 | 80 | 73 | 55 | 100 |
| 1-13 | 4.45 | 0.99 | 1 | 50 | 70 | 39 | 100 |
| 1-14 | 4.47 | 0.99 | 1 | 30 | 61 | 34 | 100 |
| 1-15 | 4.48 | 0.98 | 1 | 20 | 50 | 25 | 100 |

Figure 12:
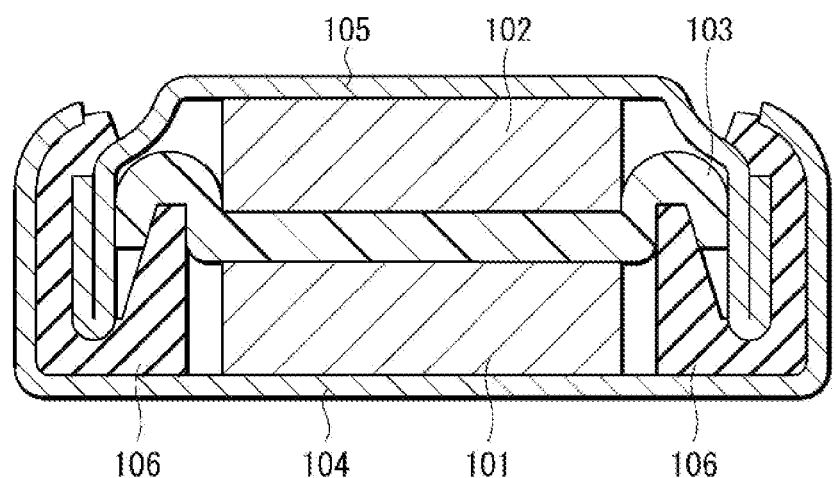
FIG. 12 is a sectional view of a configuration of a test secondary battery according to an embodiment of the present technology.

FIG. 12 illustrates a sectional configuration of the coin-type secondary battery. As illustrated in FIG. 12, the secondary battery includes a test electrode 101 housed in an outer package can 104, a counter electrode 102 housed in an outer package cup 105, a separator 103 (a fine-porous polyethylene film having a thickness of 15 μm), a gasket 106, and an electrolytic solution. The test electrode 101 and the counter electrode 102 are stacked on each other with the separator 103 interposed therebetween. The outer package can 104 and the outer package cup 105 are crimped to each other by means of the gasket 106. The test electrode 101, the counter electrode 102, and the separator 103 are each impregnated with the electrolytic solution.

In a case of examining the capacity ratio, first, the completed laminated secondary battery was disassembled to thereby collect the positive electrode 13 and the negative electrode 14.

Thereafter, the coin-type secondary battery was fabricated using the positive electrode 13 as the test electrode 101 and using a lithium metal plate as the counter electrode 102. Thereafter, the fabricated coin-type secondary battery was charged and discharged to measure a positive electrode capacity. Upon charging, the secondary battery was charged with a constant current of 0.1 C until a voltage reached 4.55 V, and was thereafter charged with the constant voltage of 4.55 V until a current reached 0.01 C. Upon discharging, the secondary battery was discharged with a constant current of 0.1 C until a voltage reached 3.5 V. It should be understood that 0.1 C and 0.01 C are values of currents that cause battery capacities (theoretical capacities) to be completely discharged in 10 hours and 100 hours, respectively.

Thereafter, the coin-type secondary battery was fabricated using the negative electrode 14 as the test electrode 101 and using the lithium metal plate as the counter electrode 102. Thereafter, the fabricated coin-type secondary battery was thereafter charged and discharged to measure a negative As described in Table 1, in a case where the positive electrode 13 included the positive electrode active material (the layered rock-salt lithium-cobalt composite oxide) and the negative electrode 14 included the negative electrode active material (graphite), and where the charge voltage Ec was set to higher than or equal to 4.38 V, the number of high-temperature cycles, the number of low-temperature cycles, and the high-temperature swelling time each varied depending on the positive electrode potential variation Ew.

Specifically, in a case where a configuration condition, i.e., the positive electrode potential variation Ew being greater than or equal to 2 mV, was satisfied (Experiment examples 1-1 to 1-10), the capacity ratio decreased as compared with a case where the configuration condition was not satisfied (Experiment examples 1-11 to 1-15). Accordingly, the number of high-temperature cycles, the number of low-temperature cycles, and the high-temperature swelling time each increased. It is considered that a reason for this is that, in the case where the above-described configuration condition was satisfied, the potential of the positive electrode 13 decreased as compared to the case where the configuration condition was not satisfied, thereby suppressing degradation of the positive electrode 13.

In particular, in a case where the configuration condition related to the positive electrode potential variation Ew described above was satisfied, a sufficiently great number of high-temperature cycles, a sufficiently great number of low-temperature cycles, and a sufficiently long high-temperature swelling time were obtained, if a configuration condition, i.e., the negative electrode potential Ef being lower than or equal to 95 mV, was also satisfied.

Experiment Examples 2-1 to 2-13

As described in Table 2, secondary batteries were fabricated following which the cyclability characteristics and the swelling characteristics of the secondary batteries were examined by similar procedures except that composition of the electrolytic solution was changed in the case where the configuration condition related to the positive electrode potential variation Ew was satisfied.

The composition of the electrolytic solution was as follows. First, composition (proportion (vol %)) of the solvent (EC and DEC) was varied. Second, composition (proportion (vol %)) of the entire solvent (EC, GBL, DEC, PP, etc.) was varied by using the chain carboxylate ester (propyl propionate (PP), ethyl propionate (EP), and methyl propionate (MP)) and the lactone (γ-butyrolactone (GBL)) as new solvents. Third, the content (wt %) of the dinitrile compound in the electrolytic solution was varied by using the dinitrile compound (succinonitrile (SN)) as a new solvent.

examined by similar procedures except that a configuration of the positive electrode 13 (a kind of the positive electrode active material, the intensity ratio I2/I1, etc.) was changed, and that an ambient-temperature cyclability characteristic was newly examined.

In a case of fabricating the positive electrode 13, a mixture of the large-diameter particles each including LiCMZ (LiCo$_{0.9}$Mg$_{0.05}$Zr$_{0.05}$O$_2$) serving as the layered rock-salt lithium-cobalt composite oxide and the small-diameter particles each including LiCMT (LiCo$_{0.9}$Mg$_{0.05}$Ti$_{0.05}$O$_2$) or LiCM (LiCo$_{0.9}$Mg$_{0.1}$O$_2$) serving as the layered rock-salt lithium-cobalt composite oxide were used as the two kinds of positive electrode active materials. In this case, the median diameter D50 (μm) of the large-diameter particles and the median diameter D50 (μm) of the

TABLE 2

| Experiment example | Carbonate ester Kind | Carbonate ester Proportion (vol %) | Lactone Kind | Lactone Proportion (vol %) | Chain carboxylate ester Kind | Chain carboxylate ester Proportion (vol %) | Dinitrile compound Kind | Dinitrile compound Content (wt %) | Number of high-temperature cycles (cycle) | Number of low-temperature cycles (cycle) | High-temperature swelling time (hour) |
|---|---|---|---|---|---|---|---|---|---|---|---|
| 1-9 | EC | 20 | DEC | 80 | — | — | — | — | 243 | 201 | 300 |
| 2-1 |    |    |    | 75 | PP | 5 | — | — | 266 | 211 | 300 |
| 2-2 |    |    |    | 70 |    | 10 | — | — | 276 | 251 | 300 |
| 2-3 |    |    |    | 40 |    | 40 | — | — | 296 | 301 | 300 |
| 2-4 |    |    |    | —  |    | 80 | — | — | 306 | 331 | 300 |
| 2-5 |    | 10 | —  | —  |    | 90 | — | — | 236 | 221 | 400 |
| 2-6 | EC | 20 | DEC | 70 | EP | 10 | — | — | 286 | 261 | 300 |
| 2-7 |    |    |    |    | MP | 10 | — | — | 296 | 271 | 300 |
| 2-8 |    |    |    |    | EP + PP | 10 + 70 | — | — | 316 | 341 | 300 |
| 2-9 | GBL | 20 | DEC | 70 | PP | 10 | — | — | 255 | 223 | 400 |
| 2-10 | EC | 20 | DEC | 40 | PP | 40 | SN | 0.5 | 296 | 301 | 300 |
| 2-11 |    |    |    |    |    |    |    | 1 | 316 | 321 | 300 |
| 2-12 |    |    |    |    |    |    |    | 3 | 346 | 331 | 400 |
| 2-13 |    |    |    |    |    |    |    | 20 | 316 | 311 | 400 |

Charge voltage Ec = 4.48 V,
Positive potential caraiation Ew = 3 mV,
Negative electrode potential Ef = 10 mV As described in Table 2, in a case where the solvent included the chain carboxylate ester and where the proportion of the chain carboxylate ester was within an appropriate range (from 10 vol % to 80 vol % both inclusive) (Experiment examples 2-2 to 2-4), the number of high-temperature cycles and the number of low-temperature cycles each further increased, as compared with a case where the proportion of the chain carboxylate ester was outside the appropriate range (Experiment examples 1-9, 2-1, and 2-5). This tendency was also similarly obtained in a case where the kind and the composition of the chain carboxylate ester were changed (Experiment examples 2-6 to 2-8) and in a case where the lactone was used (Experiment example 2-9).

Further, in a case where the solvent including the chain carboxylate ester further included the dinitrile compound, and where the content of the dinitrile compound was within an appropriate range (from 1 wt % to 20 wt % both inclusive) (Experiment examples 2-11 to 2-13), the number of high-temperature cycles and the number of low-temperature cycles each further increased, as compared with a case where the content of the dinitrile compound was outside the appropriate range (Experiment example 2-10).

Experiment Examples 3-1 to 3-16

As described in Table 3, secondary batteries were fabricated following which the cyclability characteristics and the swelling characteristics of the secondary batteries were small-diameter particles were each varied. Further, a mixture ratio between the large-diameter particles and the small-diameter particles (weight ratio=weight of large-diameter particles/weight of small-diameter particles) was adjusted to thereby vary the intensity ratio I2/I1 depending on each of the intensities I1 and I2.

Elemental analyses of surfaces of the small-diameter particles were performed using an X-ray photoelectron spectroscopy (XPS). As a result, in a case of using LiCMT including titanium as a constituent element, regions where manganese and titanium were present at substantially the same locations were partially observed, and it was therefore confirmed that magnesium titanate (MgTiO$_3$) was formed. In contrast, in a case of using LiCM including no titanium as a constituent element, magnesium titanate was not formed.

In a case of examining the ambient-temperature cyclability characteristic, first, the state of the secondary battery was stabilized by the above procedures. Thereafter, the secondary battery was charged and discharged in an ambient-temperature environment (at a temperature of 23° C.) to thereby measure a discharge capacity (the pre-cycle discharge capacity). Charging and discharging conditions were similar to those for the case of stabilizing the state of the secondary battery.

Thereafter, the secondary battery was charged and discharged for another three cycles in the same environment to thereby measure a discharge capacity (a post-cycle discharge capacity). The charging and discharging conditions were as follows. Upon first-cycle charging, the secondary battery was charged with a constant current of 1 C until a battery voltage reached 3.95 V, and was thereafter charged with a constant voltage of the battery voltage until a current reached 0.4 C. Upon second-cycle charging, the secondary battery was charged with a constant current of 0.4 C until a battery voltage reached 4.15 V, and was thereafter charged with a constant voltage of the battery voltage until a current reached 0.2 C. Upon third-cycle charging, the secondary battery was charged with a constant current of 0.2 C until a battery voltage reached 4.50 V, and was thereafter charged with a constant voltage of the battery voltage until a current reached 0.05 C. Upon discharging, the secondary battery was discharged with a constant current of 0.5 C until a battery voltage reached 3.0 V in all cycles (i.e., first to third cycles). It should be understood that 0.4 C is a value of a current that causes a battery capacity (a theoretical capacity) to be completely discharged in 2.5 hours.

Lastly, the following was calculated: capacity retention rate (%)=(post-cycle discharge capacity/pre-cycle discharge capacity)×100.

electrode active material (the layered rock-salt lithium-cobalt composite oxide) and the negative electrode 14 included the negative electrode active material (graphite), and where the above-described configuration condition (the positive electrode potential variation Ew) was satisfied: the cyclability characteristics (the high-temperature cyclability characteristic and the low-temperature cyclability characteristic) and the swelling characteristic (the high-temperature swelling characteristic) were each improved. Accordingly, a superior cyclability characteristic and a superior swelling characteristic of the secondary batteries were obtained.

Although the technology has been described above with reference to the embodiments and Examples, embodiments of the technology are not limited to those described with reference to the embodiment and Examples above and are modifiable in a variety of ways.

Specifically, although the description has been given of the laminated secondary battery and the coin-type secondary battery, this is non-limiting. For example, the secondary battery may be of any other type such as a cylindrical type or a prismatic type. Moreover, although the description has been given of a case of the battery device having a wound

TABLE 3

| Experiment example | Large-diameter particles Kind | Large-diameter particles D50 (µm) | Small-diameter particles Kind | Small-diameter particles D50 (µm) | MgTiO₃ | Weight ratio | I1 | I2 | I2/I1 | Number of high-temperature cycles (cycle) | Number of low-temperature cycles (cycle) | High-temperature swelling time (hour) | Capacity retention rate (%) |
|---|---|---|---|---|---|---|---|---|---|---|---|---|---|
| 1-9 | LiCMZ | 20 | LiCMT | 5 | Present | 83/17 | 1.53 | 0.83 | 0.54 | 243 | 201 | 300 | 86.5 |
| 3-1 | | | | | | 82/18 | 1.54 | 0.91 | 0.59 | 243 | 201 | 300 | 86.0 |
| 3-2 | | | | | | 81/19 | 1.62 | 1.01 | 0.62 | 243 | 201 | 300 | 86.0 |
| 3-3 | | | | | | 80/20 | 1.63 | 1.09 | 0.67 | 242 | 200 | 300 | 82.0 |
| 3-4 | | | | | | 79/21 | 1.71 | 1.22 | 0.71 | 242 | 200 | 300 | 77.5 |
| 3-5 | | | | | | 78/22 | 1.78 | 1.33 | 0.75 | 241 | 199 | 300 | 47.5 |
| 3-6 | LiCMZ | 9 | LiCMT | 5 | Present | 81/19 | 1.62 | 1.01 | 0.62 | 239 | 196 | 300 | 71.0 |
| 3-7 | | 10 | | | | | | | | 234 | 199 | 300 | 84.0 |
| 3-8 | | 30 | | | | | | | | 242 | 200 | 300 | 85.0 |
| 3-9 | | 40 | | | | | | | | 242 | 200 | 300 | 83.0 |
| 3-10 | | 41 | | | | | | | | 243 | 201 | 300 | 68.0 |
| 3-11 | LiCMZ | 20 | LiCMT | 0.8 | Present | 81/19 | 1.62 | 1.01 | 0.62 | 240 | 198 | 300 | 55.5 |
| 3-12 | | | | 1 | | | | | | 240 | 198 | 300 | 76.0 |
| 3-13 | | | | 7.5 | | | | | | 241 | 199 | 300 | 86.0 |
| 3-14 | | | | 10 | | | | | | 242 | 200 | 300 | 85.0 |
| 3-15 | | | | 10.2 | | | | | | 242 | 200 | 300 | 72.3 |
| 3-16 | LiCMG | 20 | LiCM | 5 | Absent | 81/19 | 1.62 | 1.01 | 0.62 | 240 | 199 | 300 | 63.5 |

Charge voltage Ec = 4.48 V,
Positive potential cariaiation Ew = 3 mV,
Negative electrode potential Ef = 10 mV As described in Table 3, in a case where the intensity ratio I2/I1 was within an appropriate range (less than or equal to 0.71) (Experiment examples 1-9 and 3-1 to 3-4), the number of high-temperature cycles and the number of low-temperature cycles each increased and the capacity retention rate also increased, as compared with a case where the intensity ratio I2/I1 was outside the appropriate range (Experiment example 3-5).

In particular, in a case where the intensity ratio I2/I1 was within the appropriate range, and where the median diameter D50 of the large-diameter particles was from 10 µm to 40 µm both inclusive and the median diameter D50 of the small-diameter particles was from 1 µm to 10 µm both inclusive (Experiment examples 3-7 to 3-9 and 3-12 to 3-14), the capacity retention rate further increased, while substantially retaining the number of high-temperature cycles and the number of low-temperature cycles.

Based upon the results described in Tables 1 to 3, in the case where the positive electrode 13 included the positive structure to be used in the secondary battery, this is non-limiting. For example, the battery device may have any other structure such as a stacked structure.

It should be understood that the effects described herein are mere examples, and effects of the technology are therefore not limited to those described herein. Accordingly, the technology may achieve any other effect.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A secondary battery comprising:
   a positive electrode including a lithium-cobalt composite oxide represented by Formula (1) and having a layered rock-salt crystal structure;

a negative electrode including graphite; and
an electrolytic solution, wherein
a potential variation of the positive electrode represented by Formula (2) is greater than or equal to 2 millivolts when the secondary battery is discharged from a full charge state by a capacity corresponding to 1 percent of a maximum discharge capacity, the full charge state being a state in which the secondary battery is charged with a constant voltage of a closed circuit voltage of higher than or equal to 4.38 volts for 24 hours, the maximum discharge capacity being a discharge capacity obtained when the secondary battery is discharged with a constant current from the full charge state until the closed circuit voltage reaches 3.00 volts, following which the secondary battery is discharged with a constant voltage of the closed circuit voltage of 3.00 volts for 24 hours, $$Li_xCo_{1-y}M_yO_{2-z}X_z \tag{1}$$

wherein
M represents at least one of titanium (Ti), vanadium (V), chromium (Cr), manganese (Mn), iron (Fe), copper (Cu), sodium (Na), magnesium (Mg), aluminum (Al), silicon (Si), tin (Sn), potassium (K), calcium (Ca), zinc (Zn), gallium (Ga), strontium (Sr), yttrium (Y), zirconium (Zr), niobium (Nb), molybdenum (Mo), barium (Ba), lanthanum (La), tungsten (W), or boron (B),
X represents at least one of fluorine (F), chlorine (Cl), bromine (Br), iodine (I), or sulfur (S), and
x, y, and z satisfy $0.8<x<1.2$, $0 \leq y<0.15$, and $0 \leq z<0.05$, potential variation(millivolt($s$)) of positive electrode=first positive electrode potential(millivolt($s$))−second positive electrode potential(millivolt($s$)) (2)

wherein
the first positive electrode potential is an open circuit potential, versus a lithium reference electrode, of the positive electrode measured in the full charge state, and
the second positive electrode potential is an open circuit potential, versus a lithium reference electrode, of the positive electrode measured in a state in which the secondary battery is discharged from the full charge state by the capacity corresponding to 1 percent of the maximum discharge capacity.

2. The secondary battery according to claim 1, wherein an open circuit potential, versus a lithium reference electrode, of the negative electrode measured in the full charge state is lower than or equal to 95 millivolts.

3. The secondary battery according to claim 1, wherein the electrolytic solution includes: a carbonate ester, a lactone, or both; and a chain carboxylate ester, and
a proportion of a volume of the chain carboxylate ester to a sum total of a volume of the carbonate ester, a volume of the lactone, and the volume of the chain carboxylate ester is from 10 volume percent to 80 volume percent.

4. The secondary battery according to claim 2, wherein the electrolytic solution includes: a carbonate ester, a lactone, or both; and a chain carboxylate ester, and
a proportion of a volume of the chain carboxylate ester to a sum total of a volume of the carbonate ester, a volume of the lactone, and the volume of the chain carboxylate ester is from 10 volume percent to 80 volume percent.

5. The secondary battery according to claim 3, wherein the chain carboxylate ester includes at least one of an acetate ester, a propionate ester, or a butyrate ester, and
a molecular weight of the chain carboxylate ester is less than or equal to 119.

6. The secondary battery according to claim 3, wherein
the electrolytic solution further includes a dinitrile compound, and
a content of the dinitrile compound in the electrolytic solution is from 1 weight percent to 20 weight percent.

7. The secondary battery according to claim 5, wherein
the electrolytic solution further includes a dinitrile compound, and
a content of the dinitrile compound in the electrolytic solution is from 1 weight percent to 20 weight percent.

8. The secondary battery according to claim 1, wherein
a curve representing a correlative relationship between a differential value and the closed circuit voltage has:
    a first peak within a range in which the closed circuit voltage is from 3.95 volts to 4.15 volts when a temperature at the time of discharging is 25 degrees Celsius, and
    a second peak within a range in which the closed circuit voltage is from 3.95 volts to 4.15 volts when a temperature at the time of discharging is 45 degrees Celsius,
the differential value is determined by differentiating the closed circuit voltage with respect to a discharge capacity at a time of discharging, and
a ratio of a maximum value of the differential value of the second peak to a maximum value of the differential value of the first peak is less than or equal to 0.71.

9. The secondary battery according to claim 2, wherein
a curve representing a correlative relationship between a differential value and the closed circuit voltage has:
    a first peak within a range in which the closed circuit voltage is from 3.95 volts to 4.15 volts when a temperature at the time of discharging is 25 degrees Celsius, and
    a second peak within a range in which the closed circuit voltage is from 3.95 volts to 4.15 volts when a temperature at the time of discharging is 45 degrees Celsius,
the differential value is determined by differentiating the closed circuit voltage with respect to a discharge capacity at a time of discharging, and
a ratio of a maximum value of the differential value of the second peak to a maximum value of the differential value of the first peak is less than or equal to 0.71.

10. The secondary battery according to claim 3, wherein
a curve representing a correlative relationship between a differential value and the closed circuit voltage has:
    a first peak within a range in which the closed circuit voltage is from 3.95 volts to 4.15 volts when a temperature at the time of discharging is 25 degrees Celsius, and
    a second peak within a range in which the closed circuit voltage is from 3.95 volts to 4.15 volts when a temperature at the time of discharging is 45 degrees Celsius,
the differential value is determined by differentiating the closed circuit voltage with respect to a discharge capacity at a time of discharging, and
a ratio of a maximum value of the differential value of the second peak to a maximum value of the differential value of the first peak is less than or equal to 0.71.

11. The secondary battery according to claim 5, wherein
a curve representing a correlative relationship between a differential value and the closed circuit voltage has:

a first peak within a range in which the closed circuit voltage is from 3.95 volts to 4.15 volts when a temperature at the time of discharging is 25 degrees Celsius, and
a second peak within a range in which the closed circuit voltage is from 3.95 volts to 4.15 volts when a temperature at the time of discharging is 45 degrees Celsius,
the differential value is determined by differentiating the closed circuit voltage with respect to a discharge capacity at a time of discharging, and
a ratio of a maximum value of the differential value of the second peak to a maximum value of the differential value of the first peak is less than or equal to 0.71.

12. The secondary battery according to claim 6, wherein
a curve representing a correlative relationship between a differential value and the closed circuit voltage has:
a first peak within a range in which the closed circuit voltage is from 3.95 volts to 4.15 volts when a temperature at the time of discharging is 25 degrees Celsius, and
a second peak within a range in which the closed circuit voltage is from 3.95 volts to 4.15 volts when a temperature at the time of discharging is 45 degrees Celsius,
the differential value is determined by differentiating the closed circuit voltage with respect to a discharge capacity at a time of discharging, and
a ratio of a maximum value of the differential value of the second peak to a maximum value of the differential value of the first peak is less than or equal to 0.71.

13. The secondary battery according to claim 8, wherein the positive electrode includes
first positive electrode active material particles each including the lithium-cobalt composite oxide and having a first median diameter D50 from 10 micrometers to 40 micrometers, and
second positive electrode active material particles each including the lithium-cobalt composite oxide and having a second median diameter D50 from 1 micrometer to 10 micrometers.

14. A secondary battery comprising:
a positive electrode including first positive electrode active material particles and second positive electrode active material particles including a lithium-cobalt composite oxide represented by Formula (1) and having a layered rock-salt crystal structure;
a negative electrode including graphite; and
an electrolytic solution, wherein
a potential variation of the positive electrode represented by Formula (2) is greater than or equal to 2 millivolts when the secondary battery is discharged from a full charge state by a capacity corresponding to 1 percent of a maximum discharge capacity, the full charge state being a state in which the secondary battery is charged with a constant voltage of a closed circuit voltage of higher than or equal to 4.38 volts for 24 hours, the maximum discharge capacity being a discharge capacity obtained when the secondary battery is discharged with a constant current from the full charge state until the closed circuit voltage reaches 3.00 volts, following which the secondary battery is discharged with a constant voltage of the closed circuit voltage of 3.00 volts for 24 hours, $$Li_xCo_{1-y}M_yO_{2-z}X_z \quad (1)$$

wherein
M represents at least one of titanium (Ti), vanadium (V), chromium (Cr), manganese (Mn), iron (Fe), nickel (Ni), copper (Cu), sodium (Na), magnesium (Mg), aluminum (Al), silicon (Si), tin (Sn), potassium (K), calcium (Ca), zinc (Zn), gallium (Ga), strontium (Sr), yttrium (Y), zirconium (Zr), niobium (Nb), molybdenum (Mo), barium (Ba), lanthanum (La), tungsten (W), or boron (B),
X represents at least one of fluorine (F), chlorine (Cl), bromine (Br), iodine (I), or sulfur (S), and
x, y, and z satisfy $0.8<x<1.2$, $0\leq y<0.15$, and $0<z<0.05$, potential variation(millivolt(s)) of positive electrode=first positive electrode potential(millivolt(s))−second positive electrode potential(millivolt(s))     (2)

wherein
the first positive electrode potential is an open circuit potential, versus a lithium reference electrode, of the positive electrode measured in the full charge state, and
the second positive electrode potential is an open circuit potential, versus a lithium reference electrode, of the positive electrode measured in a state in which the secondary battery is discharged from the full charge state by the capacity corresponding to 1 percent of the maximum discharge capacity,
wherein the lithium-cobalt composite oxide included in each of the first positive electrode active material particles includes magnesium and zirconium as constituent elements,
wherein the lithium-cobalt composite oxide included in each of the second positive electrode active material particles includes magnesium and titanium, as constituent elements, and
wherein, in the second positive electrode active material particles, at least a portion of the magnesium and at least a portion of the titanium form magnesium titanate ($MgTiO_3$).

15. The secondary battery according to claim 14, wherein the first positive electrode active material particles having a first median diameter D50 from 10 micrometers to 40 micrometers, and wherein the second positive electrode active material particles having a second median diameter D50 from 1 micrometer to 10 micrometers.

16. The secondary battery according to claim 14, wherein an open circuit potential, versus a lithium reference electrode, of the negative electrode measured in the full charge state is lower than or equal to 95 millivolts.

17. A secondary battery comprising:
a positive electrode including a lithium-cobalt composite oxide represented by Formula (1) and having a layered rock-salt crystal structure;
a negative electrode including graphite; and
an electrolytic solution, wherein
a potential variation of the positive electrode represented by Formula (2) is greater than or equal to 2 millivolts when the secondary battery is discharged from a full charge state by a capacity corresponding to 1 percent of a maximum discharge capacity, the full charge state being a state in which the secondary battery is charged with a constant voltage of a closed circuit voltage of higher than or equal to 4.38 volts for 24 hours, the maximum discharge capacity being a discharge capacity obtained when the secondary battery is discharged with a constant current from the full charge state until the closed circuit voltage reaches 3.00 volts, following which the secondary battery is discharged with a constant voltage of the closed circuit voltage of 3.00 volts for 24 hours, $$Li_xCo_{1-y}M_yO_{2-z}X_z \tag{1}$$

wherein

M represents at least one of titanium (Ti), vanadium (V), chromium (Cr), manganese (Mn), iron (Fe), nickel (Ni), copper (Cu), sodium (Na), magnesium (Mg), aluminum (Al), silicon (Si), tin (Sn), potassium (K), calcium (Ca), zinc (Zn), gallium (Ga), strontium (Sr), yttrium (Y), zirconium (Zr), niobium (Nb), molybdenum (Mo), barium (Ba), lanthanum (La), tungsten (W), or boron (B), X represents at least one of fluorine (F), chlorine (Cl), bromine (Br), iodine (I), or sulfur (S), and x, y, and z satisfy $0.8<x<1.2$, $0\leq y<0.15$, and $0<z<0.05$, $$\text{potential variation(millivolt}(s)\text{) of positive electrode} = \text{first positive electrode potential(millivolt}(s)\text{)} - \text{second positive electrode potential(millivolt}(s)\text{)} \tag{2}$$

wherein the first positive electrode potential is an open circuit potential, versus a lithium reference electrode, of the positive electrode measured in the full charge state, and the second positive electrode potential is an open circuit potential, versus a lithium reference electrode, of the positive electrode measured in a state in which the secondary battery is discharged from the full charge state by the capacity corresponding to 1 percent of the maximum discharge capacity.

18. The secondary battery according to claim 17, wherein an open circuit potential, versus a lithium reference electrode, of the negative electrode measured in the full charge state is lower than or equal to 95 millivolts.

* * * * *